(12) United States Patent
Izoe

(10) Patent No.: US 8,833,887 B2
(45) Date of Patent: Sep. 16, 2014

(54) CONTROL DEVICE AND CONTROL METHOD FOR CONTROLLING PRINTING UNIT TO PERFORM MULTI-PASS PRINTING

(71) Applicant: Brother Kogyo Kabushiki Kaisha, Aichi (JP)

(72) Inventor: Shintaro Izoe, Kiyosu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 64 days.

(21) Appl. No.: 13/626,350

(22) Filed: Sep. 25, 2012

(65) Prior Publication Data

US 2013/0088538 A1    Apr. 11, 2013

(30) Foreign Application Priority Data

Oct. 7, 2011   (JP) ................. 2011-223487

(51) Int. Cl.
| | |
|---|---|
| B41J 29/38 | (2006.01) |
| B41J 2/21 | (2006.01) |
| H04N 1/60 | (2006.01) |
| B41J 11/42 | (2006.01) |
| G06K 15/10 | (2006.01) |
| H04N 1/17 | (2006.01) |
| H04N 1/191 | (2006.01) |

(52) U.S. Cl.
CPC ............. *B41J 2/2132* (2013.01); *H04N 1/60* (2013.01); *H04N 1/1915* (2013.01); *B41J 11/42* (2013.01); *G06K 15/105* (2013.01); *H04N 1/17* (2013.01)
USPC ............................................... 347/9

(58) Field of Classification Search
CPC ............. B41J 2/04541; B41J 2/04543; B41J 2/04563; B41J 2/0458; B41J 2/04581; B41J 2/04588; B41J 2/04591; B41J 3/60; B41J 11/0095; B41J 11/42; B41J 29/38; B41J 29/393
USPC ........................................... 347/5–20, 40–43
See application file for complete search history.

(56) References Cited

U.S. PATENT DOCUMENTS

| | | | |
|---|---|---|---|
| 6,511,143 B1 | 1/2003 | Ishikawa et al. | |
| 2002/0024556 A1* | 2/2002 | Otsuki | 347/41 |

(Continued)

FOREIGN PATENT DOCUMENTS

| | | |
|---|---|---|
| JP | 60-107975 A | 6/1985 |
| JP | 2000-103088 A | 4/2000 |
| JP | 2010-017976 A | 1/2010 |

*Primary Examiner* — Manish S Shah
*Assistant Examiner* — Roger W Pisha, II
(74) *Attorney, Agent, or Firm* — Scully, Scott, Murphy & Presser, P.C.

(57) ABSTRACT

A control device includes an execution unit, a determining unit, and a setting unit. The execution unit controls a printing unit to execute a multi-pass printing for a predetermined partial area of printing medium by executing sub scans and a prescribed number of times of main scans. In the main scan, a print head of the printing unit forms dots on the recording medium while being conveyed in a main scanning direction. In the sub-scan, the printing medium is conveyed in a sub-scanning direction. The determining unit determines an acceptable range based on an actual conveyance error in the sub-scanning direction. The setting unit sets the prescribed number to N when a representative value of predetermined partial area falls in the acceptable range, and sets the prescribed number to M being an integer greater than N when the representative value does not fall in the acceptable range.

10 Claims, 17 Drawing Sheets

(56) References Cited

U.S. PATENT DOCUMENTS

| | | | |
|---|---|---|---|
| 2008/0252675 A1* | 10/2008 | Yasutani et al. | 347/16 |
| 2008/0252676 A1* | 10/2008 | Yasutani et al. | 347/16 |
| 2008/0252677 A1* | 10/2008 | Tajika et al. | 347/16 |
| 2009/0003854 A1* | 1/2009 | Naoi et al. | 399/38 |
| 2010/0245446 A1* | 9/2010 | Nishikori et al. | 347/15 |
| 2010/0245470 A1* | 9/2010 | Murayama et al. | 347/37 |

* cited by examiner

CONTROL DEVICE AND CONTROL METHOD FOR CONTROLLING PRINTING UNIT TO PERFORM MULTI-PASS PRINTING

CROSS REFERENCE TO RELATED APPLICATION

This application claims priority from Japanese Patent Application No. 2011-223487 filed Oct. 7, 2011. The entire content of the priority application is incorporated herein by reference.

TECHNICAL FIELD

The present invention relates to a control device and control method for controlling a printing unit to perform a multi-pass printing.

BACKGROUND

Multi-pass printing is a conventional technology in which one unit of an image is formed using a plurality of scans. Various technologies related to multi-pass printing have been proposed. One such technology modifies the number of passes for each printing region during the image-forming process.

SUMMARY

In reality, however, the conventional device does not take sufficient steps to account for both the printing device and the image to be printed when modifying the number of passes during the image-forming operation.

In view of the foregoing, it is an object of the present invention to provide a technique for setting the number of scans performed to complete printing in a partial region of a printing medium to a value appropriate for both the printing device and the image being printed.

In order to attain the above and other objects, the invention provides a control device configured to control a printing unit to execute a multi-pass printing. The printing unit includes a print head, first conveying unit, a head driving unit, and a second conveying unit. The print head has a plurality of nozzles. The first conveying unit is configured to reciprocate the print head in a first direction relative to a printing medium. The head driving unit is configured to drive the print head to form ink dot on the printing medium. The second conveying unit is configured to convey the printing medium in a second direction perpendicular to the first direction. The control device includes a multi-pass execution unit, an acceptable range determining unit, and a number setting unit. The multi-pass execution unit is configured to control the printing unit to execute the multi-pass printing for a predetermined partial area of the printing medium by repeatedly executing a main scan and a sub scan. In the main scan, the print head forms the ink dot on the printing medium while being conveyed by the first conveying unit in the first direction. In the sub-scan, the second conveying unit conveys the printing medium in the second direction. The predetermined partial area is printed by repeatedly executing the main scans a prescribed number of times. The acceptable range determining unit is configured to determine an acceptable range based on an actual error in a conveyance amount of the second conveying unit. The number setting unit is configured to set the prescribed number based on the acceptable range and a representative value of the predetermined partial area. The number setting unit sets the prescribed number to N where N is an integer greater than or equal to 2 when the representative value falls in the acceptable range. The number setting unit sets the prescribed number to M where M is an integer greater than N when the representative value does not fall in the acceptable range.

According to another aspect, the present invention provides a control method for executing a multi-pass printing for a predetermined partial area of a printing medium by repeatedly executing a main scan and a sub scan. In the main scan, a print head forms the ink dot on a printing medium while being conveyed in a first direction. In the sub-scan, the printing medium is conveyed in a second direction perpendicular to the first direction. The predetermined partial area is printed by repeatedly executing the main scans at a prescribed number of times. The control method includes: acquiring an actual error in a conveyance amount in the second direction; acquiring error data indicating relationships between a maximum acceptable error in a conveyance amount in the second direction and representative value of the predetermined partial area; setting a pass number to N where N is an integer greater than or equal to 2 when the actual error is smaller than or equal to the acceptable error corresponding to the representative value; setting the pass number to M wherein M is an integer greater than N when the actual error is greater than the acceptable error corresponding to the representative value; and executing the multi-pass printing for the predetermined partial area by executing the pass number of main scans.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
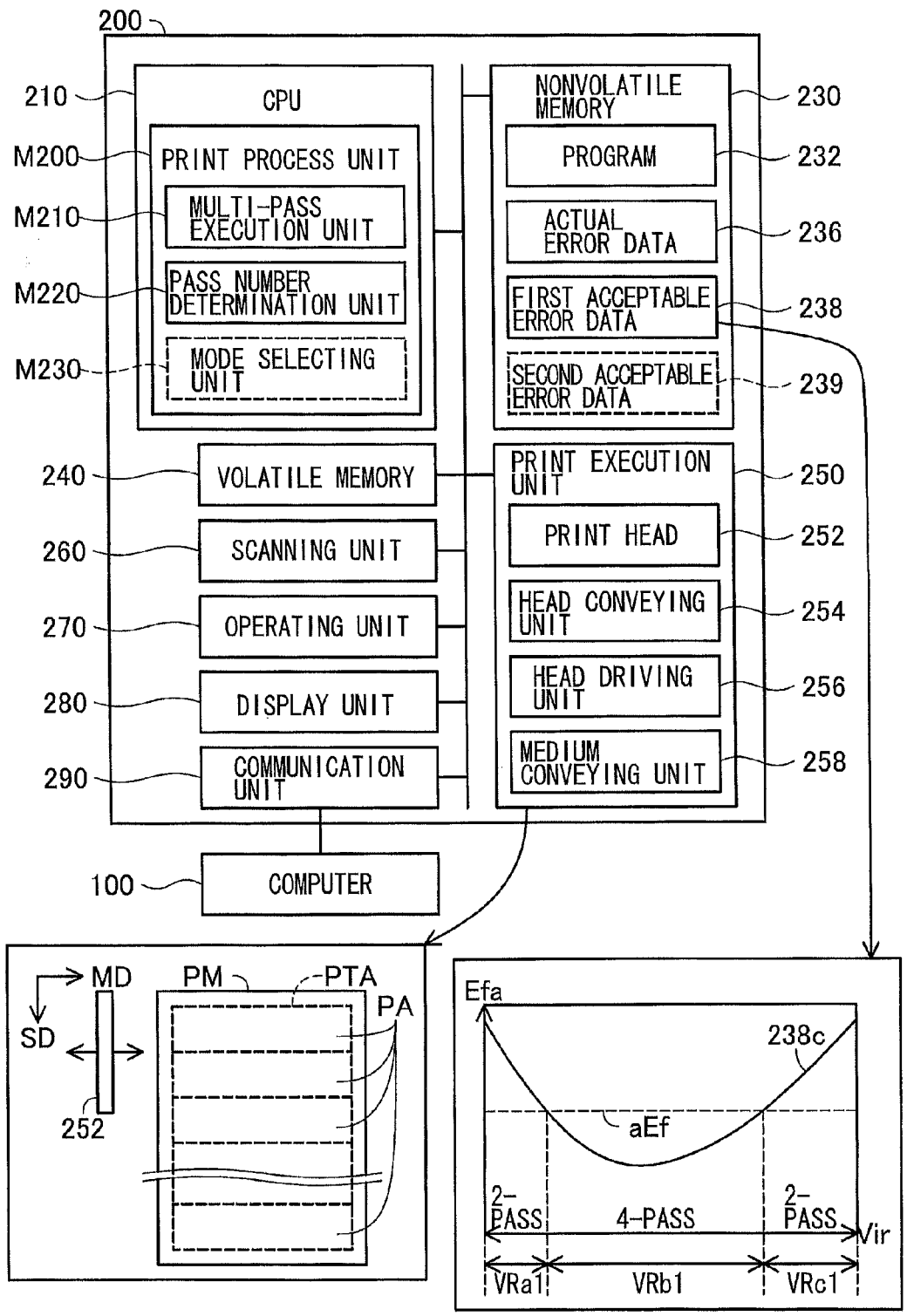
FIG. 1 is a block diagram showing a multifunction peripheral according to a first embodiment of the present invention.

As shown in FIG. 1, a multifunction peripheral (MFP) 200 according to a first embodiment includes a CPU 210, a nonvolatile memory 230 such as an EEPROM, a volatile memory such as a DRAM, a print execution unit 250, a scanning unit 260, an operating unit 270, a display unit 280, and a communication unit 290.

The scanning unit 260 performs an optical scan to generate image data. The operating unit 270 includes a touchscreen or buttons and other operating members that are operated by the user. The display unit 280 is a liquid crystal display or other display unit for displaying images. The communication unit 290 is an interface, such as a USB interface or IEEE 802.11 wireless interface, for enabling the MFP 200 to communicate with an external electronic device, such as a computer 100 or a digital camera.

The print execution unit 250 is a device that prints images on printing media by ejecting ink droplets in a plurality of colors (cyan, magenta, yellow, and black, for example). The print execution unit 250 includes a print head 252, a head conveying unit 254, a head driving unit 256, and a medium conveying unit 258. The print head 252 has a plurality of nozzles Nz through which ink is ejected. The nozzles Nz (FIG. 8) are arranged at a fixed pitch in a sub-scanning direction described later. In the first embodiment, the plurality of nozzles for cyan, the plurality of nozzles for magenta, the plurality of nozzles for yellow, and the plurality of nozzles for black are arranged at corresponding positions in the sub-scanning direction.

The diagram in the bottom of FIG. 1 provides a general description of a printing medium PM, a main scanning direction MD, and the sub-scanning direction SD. The head conveying unit 254 reciprocates the print head 252 along the main scanning direction MD. The head driving unit 256 drives the print head 252 to eject ink droplets from nozzles. The ejected ink droplets impact the printing medium PM to form ink dots thereon. In the first embodiment, three sizes of ink dots can be formed: large dots, medium dots, and small dots, but the number of ink dot sizes may be set to just one size, two size, or more than three sizes. The head driving unit 256 drives the print head 252 while the print head 252 is moving in order to form ink dots along a line extending in the main scanning direction MD (hereinafter referred to as a "raster line"). In the following description, the process of forming ink dots while moving the head driving unit 256 will be referred to as a "main scan." Although not shown in the drawings, the medium conveying unit 258 includes a medium conveying motor and a conveying roller that is driven to rotate by the medium conveying motor. The conveying roller of the medium conveying unit 258 rotates to convey a recording medium interposed between the conveying roller and another member (such as a follow roller or plate member) in the direction opposite the sub-scanning direction SD. In the following description, movement of the printing medium will hereinafter be referred to as a "sub scan." In a sub scan, the print head 252 moves relative to the printing medium PM in the sub-scanning direction SD. In the first embodiment, the sub-scanning direction SD is orthogonal to the main scanning direction MD. In the following description, the "upstream side" of an object relative to the sub-scanning direction SD will be the side positioned relatively in the direction opposite the sub-scanning direction SD, while the "downstream side" will be the side positioned relatively in the sub-scanning direction SD. The structure of the medium conveying unit 258 is not limited to the medium conveying motor and conveying roller of the preferred embodiment, but may be any of a variety of structures used to convey printing media. Any of a variety of structures may also be employed for the print head 252, head conveying unit 254, and head driving unit 256.

Stored in advance in the nonvolatile memory 230 are a program 232, actual error data 236, and first acceptable error data 238. In the first embodiment, the program 232 and the data 236 and 238 are stored in the nonvolatile memory 230 when the MFP 200 is manufactured. As will be described later, the actual error data 236 includes data configured for each type of the print execution unit 250. The nonvolatile memory 230 may also store second acceptable error data 239. A configuration that employs the second acceptable error data 239 will be described later in the eighth embodiment.

The CPU 210 controls the overall operations of the MFP 200 by executing the program 232 stored in the nonvolatile memory 230. In the first embodiment, the CPU 210 operates as a print process unit M230. The print process unit M200 includes a multi-pass execution unit M210, and a pass number determination unit M220. The print process unit M200 may also include a mode selection unit M230. A configuration employing the mode selection unit M230 will be described later in the eighth embodiment. When the CPU 210 executes a process as one of these process units, the process will be described below as being executed by the process unit.

The print process unit M200 controls the print execution unit 250 to print images on printing media based on input image data. The multi-pass execution unit M210 receives the input image data from the computer 100 or another external device connected to the communication unit 290, for example. The CPU 210 converts the input image data to bitmap data (through a rasterization process). The pixel data included in the bitmap data is RGB pixel data that expresses the color of each pixel with gradation values (256 levels from 0 to 255, for example) for the three color components red (R), green (G), and blue (B). The pixel density of the bitmap data is identical to the printing resolution.

Next, the multi-pass execution unit M210 converts the RGB pixel data included in the bitmap data into ink pixel data expressing the colors of the pixels with gradation values (256 levels from 0 to 255, for example) for the colors of ink used by the print execution unit 250 (cyan, magenta, yellow, and black in the first embodiment) in a color conversion process. Next, the multi-pass execution unit M210 converts the bitmap data that includes this ink pixel data into dot data representing the state of ink dot formation for each pixel. In the first embodiment, states of ink dot formation are expressed as one of four levels: "no dot," "small," "medium," and "large." The process for converting bitmap data to dot data is called a halftone process. In the first embodiment, the halftone process is implemented using an error diffusion method well known in the art. However, the halftone process is not limited to error diffusion, but may be any of a variety of processes known in the art, such as a process employing a dither matrix. The process for generating dot data from the input image data may include a variety of other processes, such as a color correction process.

The multi-pass execution unit M210 controls the print execution unit 250 to execute a printing operation based on the dot data. In the first embodiment, the multi-pass execution unit M210 combines main scans and sub scans to execute multi-pass printing in which a partial area PA of the printing medium PM is printed using a plurality of main scans. The diagram in the bottom of FIG. 1 shows the general arrangement of the partial areas PA on the printing medium PM. In the first embodiment, the partial areas PA are band-like regions extending along the main scanning direction MD and are juxtaposed in the sub-scanning direction SD. All of the partial areas PA cover the entire printable region PTA of the printing medium PM.

The pass number determination unit M220 sets a number of main scans for each partial area PA. Hereinafter, one main scan will be referred to as a "pass," and the number of main scans will be referred to as the "pass number." The pass number determination unit M220 sets the pass number to either "2" or "4" in the first embodiment. When the pass number is "2" (two-pass printing), ink dot formation in one partial area PA is distributed over at least two main scans. In the first embodiment, the conveyance amount in the sub scanning direction is constant during two-pass printing and main scans and sub scans are alternated. Odd-numbered raster lines in the partial area are printed in one of the two main scans, while even-numbered raster lines are printed in the other mains can. In this process, called interlace printing, after raster lines are printed in a first main scan, different raster lines are formed in a subsequent main scan such that one line is printed between each pair of adjacent lines formed in the previous main scan.

When the pass number is "4" (four-pass printing), ink dot formation for one partial area PA is distributed among at least four main scans. A variety of methods may be employed to distribute the plurality of ink dots in the partial area PA among four main scans. For example, ink dots may be formed in different raster lines for each of the main scans. Alternatively, ink dot formation in a single raster line may, be distributed among the plurality of main scans. In the first embodiment, the printing resolution in the sub-scanning direction SD is the same for both two-pass printing and four-pass printing.

Two-pass printing requires fewer main scans to print a single partial area PA than four-pass printing and is consequently faster for printing images. Four-pass printing distributes ink dot formation within a single partial area PA among a larger number of main scans than two-pass printing. Thus, even if ink dots recorded in one main scan deviate from their intended position due to error (error in the conveyance amount for a sub scan, for example), ink dots are formed in the same partial area PA during multiple other main scans, thereby making positional deviation for a few ink dots less obtrusive and improving image quality.

To set the pass number, the pass number determination unit M220 uses the actual error data 236 and first acceptable error data 238, as well as a representative input gradation value representative of the partial area PA. FIG. 1 includes a graph for explaining the first acceptable error data 238. The horizontal axis of this graph denotes the representative input gradation value Vir, while the vertical axis denotes the acceptable error Efa. The first acceptable error data 238 establishes a correlation (correspondence relationship) between the representative input gradation values Vir and the acceptable error Efa (a first curve 238c).

The representative input gradation value Vir represents the input gradation value of the image region corresponding to the partial area PA. The input gradation value denotes the density (or brightness) of an image to be printed in the partial area PA. In the first embodiment, the input gradation value is the gradation values of ink colors acquired from a color conversion process employing the input image data. The representative input gradation value Vir is set according to a statistical process using the input gradation value of each pixel in the partial area PA. For example, the representative input gradation value Vir may be set to the average of the input gradation values in the partial area PA. The representative input gradation value Vir is set for each ink color.

The acceptable error Efa denotes the acceptable amount of conveyance error when conveying the printing medium PM. In general, the larger the conveyance error, the larger the positional deviation of ink dots recorded on the printing medium PM. When the positional deviation of ink dots is great, the color of the printed image can deviate from its intended color. The color has a greater tendency to deviate as the error in conveyance amount increases. The acceptable error Efa denotes the maximum error for which color deviation caused by such conveyance error is tolerable. As shown in FIG. 1, the acceptable error Efa is dependent on the density of color being rendered (or the representative input gradation value Vir).

The actual error data 236 represents the actual error produced when the medium conveying unit 258 conveys the printing medium PM (referred to as the "actual error aEf"). The pass number determination unit M220 sets the number of main scans to "2" when the actual error aEf represented by the actual error data 236 is less than or equal to the acceptable error Efa associated with the representative input gradation value Vir of the partial area PA, and to "4" when the actual error aEf exceeds the acceptable error Efa. A first range VRa1 and a third range VRc1 denote ranges of representative input gradation values Vir for two passes, and a second range VRb1 denotes the range of representative input gradation values Vir for four passes.

In the first embodiment, the first acceptable error data 238 establishes correlations for each ink color. The pass number determination unit M220 determines the number of main scans for each color of ink used in a single partial area PA. If the number is "4" for at least one ink color, the pass number determination unit M220 sets the pass number of the partial area PA to "4". If the number is "2" for all colors of ink, the pass number determination unit M220 sets the pass number of the partial area PA to "2". However, it is possible to employ any of a variety of methods for setting the pass number in a single partial area PA when a plurality of ink colors is used for printing. For example, the pass number determination unit M220 may set the pass number for a partial area PA to "4" on the condition that the total number of ink colors for which the pass number was determined to be "4" is greater than or equal to a prescribed threshold. Here, the threshold may be "2" or greater.

Figure 2:
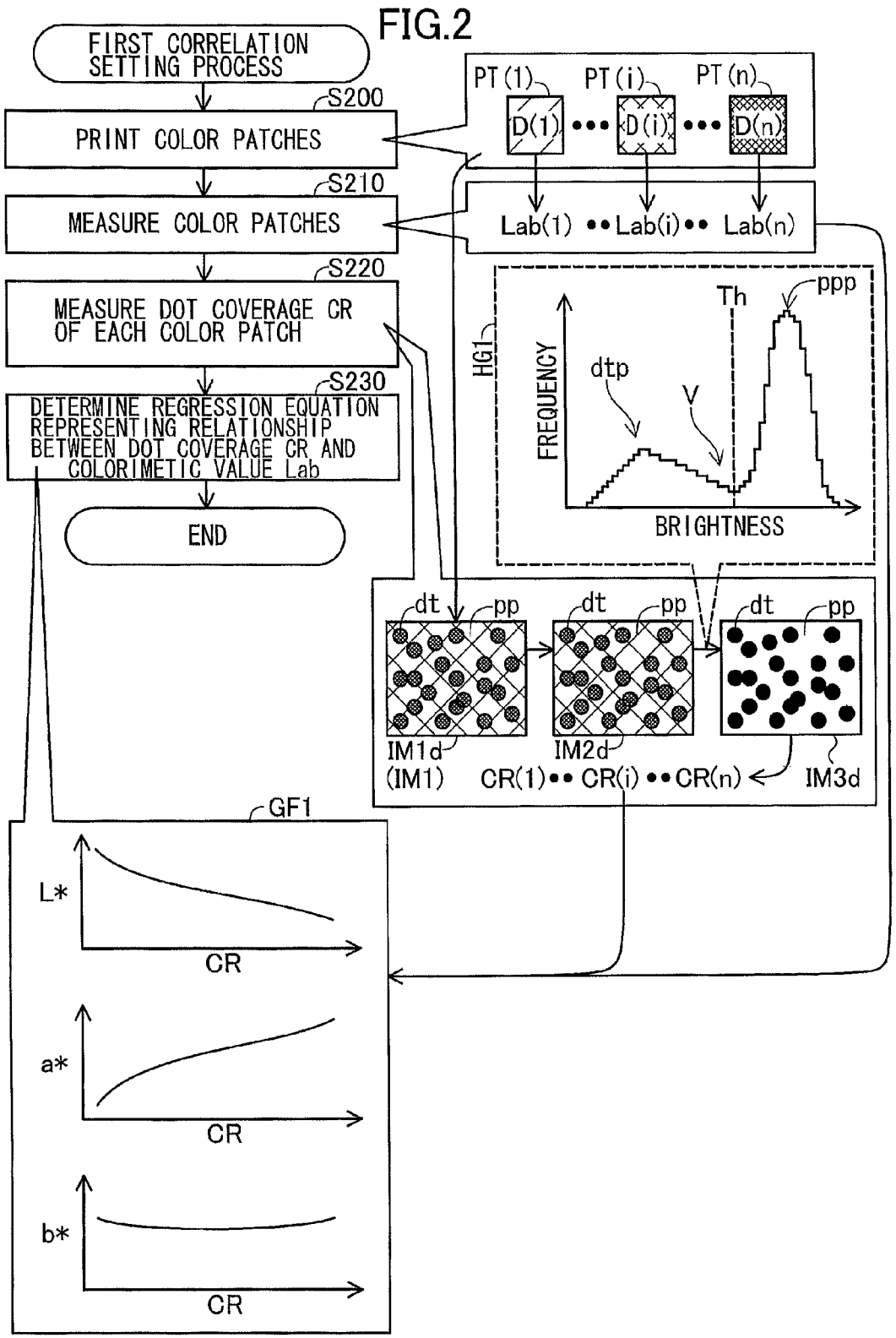
FIG. 2 is an explanatory diagram illustrating a first correlation setting process according to the first embodiment.
Figure 3:
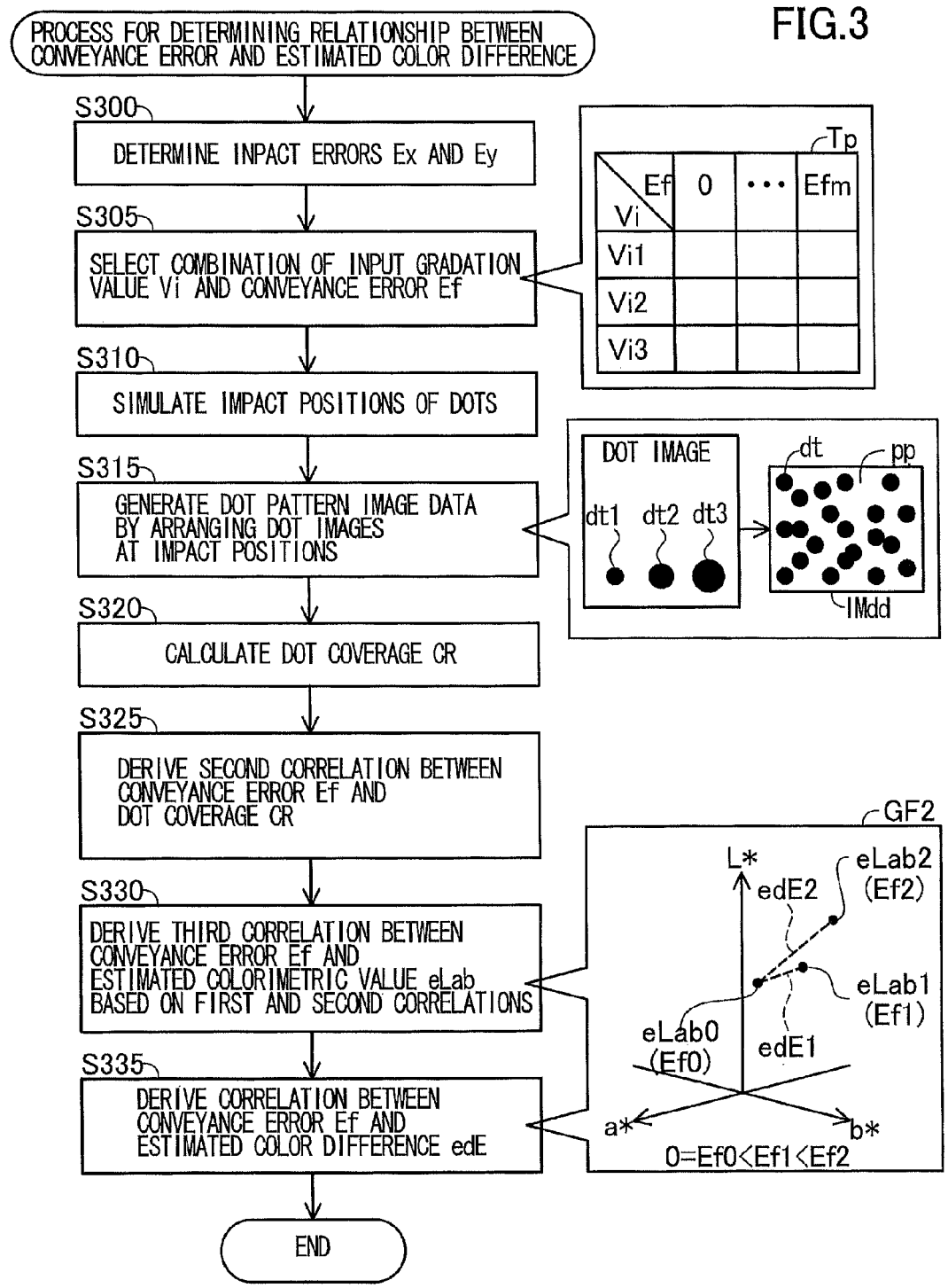
FIG. 3 is an explanatory diagram illustrating a process for determining a relationship between a conveyance error and estimated color difference according to the first embodiment.

Setting the First acceptable error data 238: FIGS. 2-3, and Bottom of FIG. 4

Figure 4:
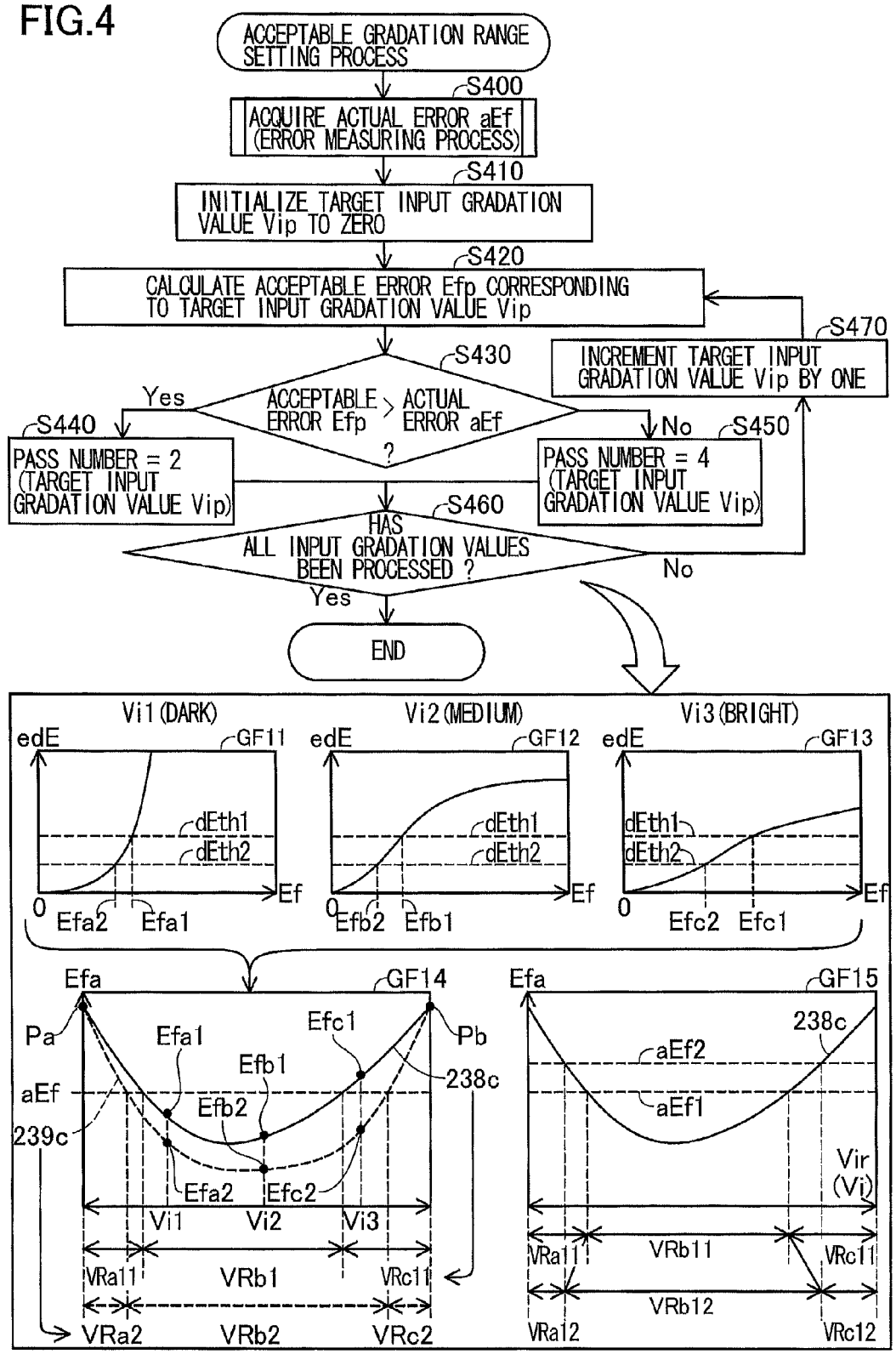
FIG. 4 is an explanatory diagram illustrating an acceptable gradation input rage setting process and a process for determining a first acceptable error data according to the first embodiment.

FIGS. 2 through 4 are flowcharts illustrating steps in a process for setting the first acceptable error data 238 (see FIG. 1). Specifically, the process in FIGS. 2 and 3 serves to derive a correlation between a conveyance error Ef and an estimated color difference edE for each of a plurality of input gradation values Vi. Next, the acceptable error Efa corresponding to each of the plurality of input gradation values Vi is used to extract a correlation between the representative input gradation values Vir and acceptable error Efa (i.e., the first acceptable error data 238; see the diagram on the bottom of FIG. 4). FIGS. 2 through 4 show the process of setting the first acceptable error data 238 for one ink color.

FIG. 2 illustrates steps in a first correlation setting process. The first correlation indicates the relationship between a dot coverage CR and colorimetric values Lab. In S200 at the beginning of the process in FIG. 2, the MFP 200 prints a plurality of color patches (hereinafter simply called "patches") on recording media based on image data having discrete input gradation values. A color patch in the first embodiment denotes an image region produced in a substantially uniform color. The top diagram on the right side in FIG. 2 shows a conceptual drawing of n (where n is an integer of 2 or greater) printed patches PT1-PTn. Each patch PT represents an image of a substantially uniform density printed using one color of ink. Since the input gradation value differs for each patch PT, a density D differs for each printed patch PT.

In S210 a colorimeter (not shown) is used to measure the color of each patch PT. Colorimetric values for each patch PT are expressed in a device-independent color space, such as the L*a*b* color space. Hereinafter the measured color values will be referred to as colorimetric values Lab.

In S220 the dot coverage CR of each patch PT is measured. In FIG. 2, a first image IM1 is an enlarged partial view of a patch PT. The first image IM1 includes ink dots dt and an exposed portion pp of the recording medium that is not covered by the ink dots dt. The dot coverage CR is the percentage of surface area in the printed patch PT that is covered by ink dots dt.

In the first embodiment, a microscope (not shown) is used in S220 to enlarge the printed patch PT. Next, an image sensor (not shown) is used to optically read the enlarged image and to generate first image data IM1$d$ representing the first image IM1. Based on the first image IM1, the pixel density in the first image data IM1$d$ is greater than the printing resolution. In other words, the pixel density of the first image data IM1$d$ is set such that a single ink dot dt is rendered in the first image data IM1$d$ by a cluster of pixels (several to tens of pixels).

Next, the CPU 210 performs a grayscale conversion to generate second image data IM2$d$ in grayscale from the first image data IM1$d$ representing the color image. This grayscale conversion step is omitted when the first image data IM1$d$ is already grayscale data.

Next, the CPU 210 generates third image data IM3$d$, comprising binary values, by comparing the pixel values (brightness values) in the second image data IM2$d$ to a threshold Th. A histogram HG1 in FIG. 2 shows a sample distribution of brightness values in the second image data IM2$d$. The brightness distribution in this example has two peaks dtp and ppp. The first peak dtp denotes the brightness value of pixels representing ink dots dt. The second peak ppp, which is brighter than the first peak dtp, indicates the brightness value for pixels representing the exposed portion pp. In the first embodiment, the threshold Th is set to a value equivalent to the valley V (stationary point) between the two peaks dtp and ppp. Pixels having a smaller brightness value than the threshold Th (dark pixels) are classified as pixels representing ink dots dt, while pixels having a brightness value greater than or equal to the threshold Th (bright pixels) are classified as pixels representing the exposed portion pp. The operator may set the threshold Th through a manual operation, or a computer (not shown) may be used to automatically set the threshold Th by analyzing the histogram.

Next, the dot coverage CR is derived from the third image data IM3$d$. In the first embodiment, the dot coverage CR is the percentage of pixels that represent ink dots dt in the region corresponding to the patch PT. The process for measuring the dot coverage CR described above is performed for each patch PT. Further, a computer (not shown) is used to execute the grayscale conversion, thresholding (binarization), and calculation of the dot coverage CR described above.

In S230 the CPU 210 computes and determines a regression equation representing the relationship between the dot coverage CR and the colorimetric values Lab. A graph GF1 in FIG. 2 shows the relationship between the colorimetric values Lab (L*, a*, and b*) measured in S210 and the dot coverage CR measured in S220. Here, n correlations are determined from n patches PT. In S230 the n correlations are used to calculate the regression equation. The regression equation may employ polynomial regression, for example. However, the method for establishing correlations between the dot coverage CR and the colorimetric values Lab using the n correlations is not limited to a regression equation, but may be any of a variety of methods, such as interpolation and extrapolation.

This completes the process for setting correlations between the dot coverage CR and colorimetric values Lab (first correlations). Since the patches PT are used to identify correlations between the dot coverage CR and colorimetric values Lab, positional deviation of ink dots within the patch PT is allowed. Any method may be used to print the patches PT, including two-pass and four-pass printing. However, the printer used to print the patches PT should be the same model as the MFP 200.

FIG. 3 illustrates steps in the process for determining the relationship between the conveyance error Ef and the estimated color difference edE. The process in FIG. 3 uses simulation results for a print (the simulated dot formation state). In S300 at the beginning of the process in FIG. 3, the CPU 210 sets impact errors Ex and Ey. The impact errors Ex and By are values indicating error in the impact position of an ink droplet caused by the drive and movement of the print head 252. The first error Ex indicates error in the main scanning direction, while the second error Ey indicates error in the sub-scanning direction. The simulations incorporate random numbers conforming to a normal distribution of the impact errors Ex and By to indicate errors in the formation positions of ink dots. The impact errors Ex and By are set through experiment. For example, a grid-like pattern having ink dots arranged at equal distances in the main and sub-scanning directions is printed, and the distance between dots is measured in order to set the impact errors Ex and Ey.

S305 is performed to select a combination of the input gradation value Vi and conveyance error Ef (a combination for simulation). Simulations are performed for each of a plurality of input gradation values Vi. For each input gradation value Vi, the simulation is performed for a plurality of conveyance errors Ef Table Tp in FIG. 3 shows an example of combinations of input gradation values Vi and conveyance errors Ef. In the first embodiment, each of three input gradation values Vi (a dark input gradation value Vi1, a medium input gradation value Vi2, and a bright input gradation value Vi3) is selected. The conveyance error Ef is set to a plurality of values arranged at prescribed intervals (every micrometer, for example) within the range from 0 to a prescribed maximum Efm. Here, the total number of input gradation values Vi is not limited to three, but may be two or four or more.

In S310 the CPU 210 simulates the impact positions of dots. Here, the impact positions of ink droplets (ink dot formation positions) is simulated while varying the conveyance error Ef from 0 to the maximum Efm when printing a uniform image expressed by the input gradation value Vi in two-pass printing with the impact error set to impact errors Ex and Ey. As in normal printing operations, a halftone process is performed in this simulation to set target impact positions.

The CPU 210 generates dot pattern image data IMdd in S315. As with the third image data IM3d in FIG. 2, the dot pattern image data IMdd represents an enlarged binary image. More specifically, the dot pattern image data IMdd represents an image obtained by arranging various dot images (any of small dot images dt1, medium dot images dt2, and large dot images dt3) determined in the halftone process of S310 at impact positions set in S310. As in the process of S220 in FIG. 2, the dot images dt1, dt2, and dt3 are obtained by photographing actual ink dots through a microscope.

In S320 the dot coverage CR is calculated from the dot pattern image data IMdd according to the same method described in S220 of FIG. 2.

In S325 a second correlation between the conveyance error Ef and dot coverage CR is derived. The process in S310-S320 is performed for each input gradation value Vi (i.e., for each of the input gradation values Vi1, Vi2, and Vi3). Accordingly, correlations between the conveyance error Ef and dot coverage CR are set for each input gradation value Vi.

In S330 the CPU 210 derives a correlation between the conveyance error Ef and estimated colorimetric values eLab from the first correlation (FIG. 2) and the second correlation (S325). The first correlation denotes a correspondence between the dot coverage CR and colorimetric values Lab, while the second correlation denotes a correspondence between the conveyance error Ef and dot coverage CR. Therefore, by combining the first and second correlations, it is possible to estimate colorimetric values from the conveyance error Ef. The third correlation indicates which of the estimated colorimetric values eLab represent a single input gradation value Vi in response to variation in the conveyance error Ef. The third correlation is derived for each of a plurality of input gradation values Vi (the input gradation values Vi1, Vi2, and Vi3 in this example).

The graph GF2 in FIG. 3 shows an example of three estimated colorimetric values eLab0, eLab1, and eLab2 correlated with three conveyance error Ef0, Ef1, and Ef2 (for the same input gradation value Vi). Here, the $0^{th}$ conveyance error Ef0 is zero, the first conveyance error Ef1 is greater than zero, and the second conveyance error Ef2 is greater than the first conveyance error Ef1. As shown in the diagram, the estimated colorimetric values eLab grow farther from the estimated colorimetric values eLab0 for the case in which the conveyance error Ef is zero as the conveyance error Ef grows larger.

In S335 the CPU 210 derives a correlation between the conveyance error Ef and estimated color difference edE. The estimated color difference edE is the difference between the estimated colorimetric values eLab when the conveyance error Ef is zero and the estimated colorimetric values eLab when the conveyance error Ef is greater than zero. A color difference dE is derived from a common equation 1 given below by using L* difference dL*, a* difference da*, and b* difference db*.

$$dE = \sqrt{dL^{*2} da^{*2} db^{*2}}$$ (Equation 1)

Generally, the estimated color difference edE, grows larger as the conveyance error Ef grows larger. In the graph GF2 of FIG. 3, a second estimated color difference edE2 correlated with the second conveyance error Ef2 is larger than a first estimated color difference edE1 correlated with the first conveyance error Ef1. Correlations between the conveyance error Ef and estimated color difference edE are identified in this way for each of the plurality of input gradation values Vi (the three input gradation values Vi1, Vi2, and Vi3 in this example).

Next, correlations between the input gradation values Vi and an acceptable error are derived using the correlations between the conveyance error Ef and estimated color difference edE identified for each of the input gradation values Vi (see the bottom of FIG. 4). In the bottom of FIG. 4, there are four graphs GF11-GF14 illustrating how the first acceptable error data is derived. In the three graphs GF11, GF12, and GF13, the horizontal axis represents the conveyance error Ef, and the vertical axis the estimated color difference edE. The first graph GF11 is for the dark input gradation value Vi1, the second graph GF12 is for the medium input gradation value Vi2, and the third graph GF13 is for the bright input gradation value Vi3. Each of the graphs GF11, GF12, and GF13 indicates a correlation between the conveyance error Ef and estimated color difference edE identified in the process of FIG. 3. As illustrated in the graphs, the estimated color difference edE is larger for larger values of the conveyance error Ef.

A first threshold dEth1 for the estimated color difference edE, shown in the graphs GF11, GF12, and GF13, is a predetermined value indicating a color difference that is difficult to perceive by the human eye. The first threshold dEth1 is set to a value within the range 2-5, for example. Three conveyance errors Efa1, Efb1, and Efc1 at which the estimated color difference edE becomes the first threshold dEth1 are identified from the three graphs GF11, GF12, and GF13. Note that the first threshold dEth1 is the same for all colors of ink. However, the first threshold dEth1 may be set to different values for each of the colors of ink. In this case, a different first threshold dEth1 will be acquired for each color of ink.

The fourth graph GF14 shows the relationship (i.e., the first acceptable error) between the input gradation value Vi (representative input gradation value Vir) and the acceptable error Efa. In the fourth graph GF14, the horizontal axis indicates the input gradation value Vi, and the vertical axis the acceptable error Efa. The density is lower (the color is lighter) as the input gradation value Vi nears the right end of the horizontal axis, and the density is higher (the color is darker) as the input gradation value Vi nears the left end. The fourth graph GF14 also shows the curve 238c represented by the first acceptable error data 238 (see FIG. 1; hereinafter called the "first curve 238c"). The first curve 238c is set so as to represent the three correlations (Vi1-Efa1, Vi2-Efa2, and Vi3-Efa3). Any of a variety of methods may be used to set the first curve 238c, such as a regression equation. In the preferred embodiment, left end data Pa and right end data Pb are used together with the three correlations to set the first curve 238c. These end data Pa and Pb determine the acceptable error Efa at the ends of the range of possible input gradation values Vi. The acceptable error Efa for the end data Pa and Pb are preset equal to or slightly larger than the error values obtained through actual measurements.

The first acceptable error data 238 includes data required for identifying the first curve 238c set according to the method described above (parameters for the regression equation, for example). The first acceptable error data 238 set according to the processes described in FIGS. 2-3 and the bottom of FIG. 4 is stored in the nonvolatile memory 230 (see FIG. 1).

Acceptable Gradation Range Setting Process: Top of FIG. 4

The flowchart in the top of FIG. 4 illustrates steps in an acceptable gradation range setting process for setting the range of input gradation values Vi acceptable in two-pass printing (acceptable gradation range). This process serves to identify the acceptable gradation range using the first acceptable error data 238 derived through the process described above, and the actual error aEf. Hereinafter, the acceptable gradation range of input gradation values Vi for two-pass printing will be referred to as the "two-pass range," and the acceptable gradation range for four-pass printing will be referred to as the "four-pass range."

Figure 5:
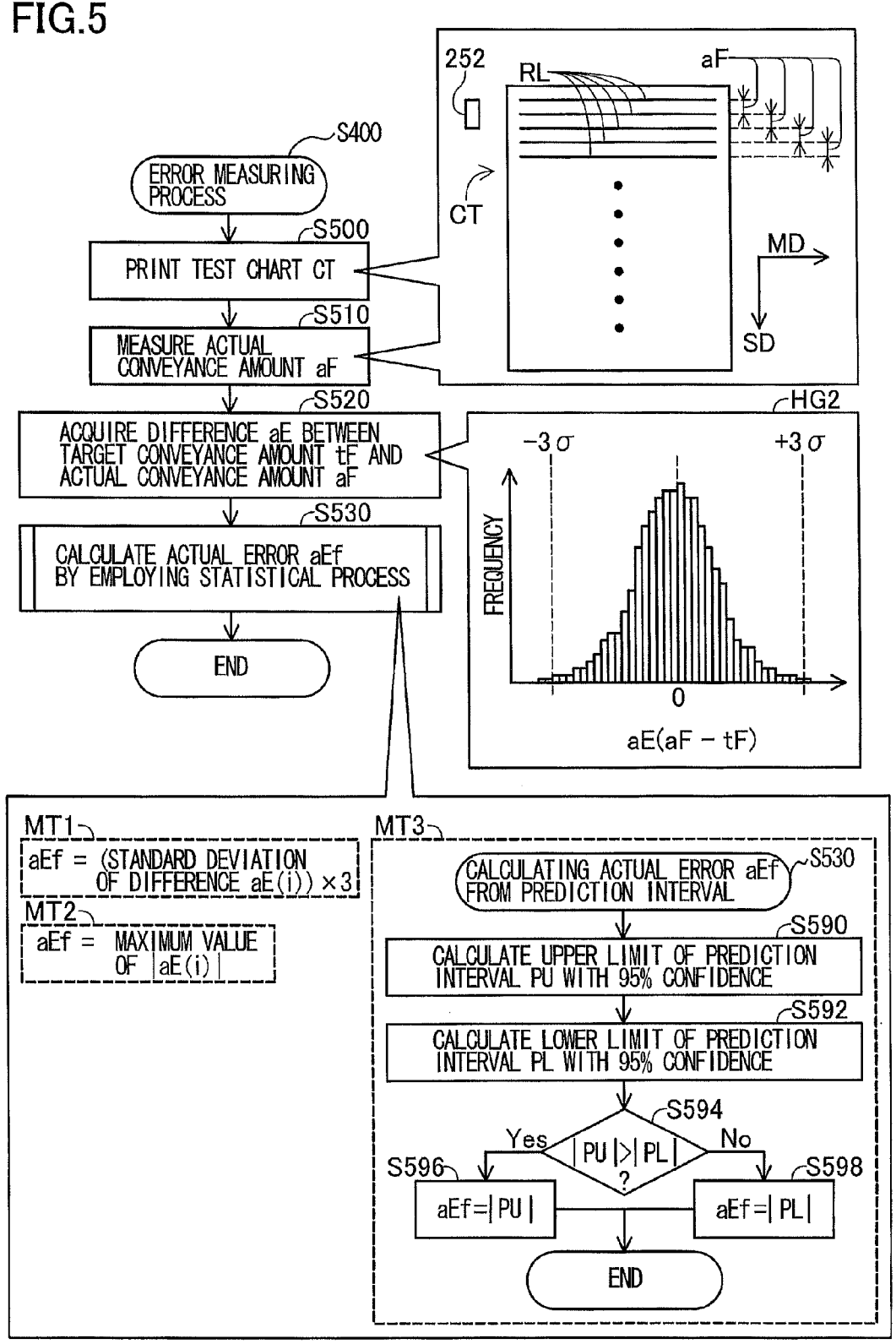
FIG. 5 is an explanatory diagram illustrating an error measuring process according to the first embodiment.

In S400 at the beginning of the process in FIG. 4, the CPU 210 acquires the actual error aEf measured. FIG. 5 is a flowchart illustrating steps in an error measuring procedure for measuring the actual error aEf. In S500 at the beginning of the process in FIG. 5, the MFP 200 (FIG. 1) is used to print a test chart CT using two-pass printing. The drawing in the upper right of FIG. 5 is a conceptual image of the test chart CT. The MFP 200 continuously ejects ink droplets from one specific nozzle for each main scan. Hence, the MFP 200 records a single raster line RL aligned in the main scanning direction MD for each main scan. The conveyance amount for a sub scan is constant in two-pass printing. Therefore, the test chart CT printed in S500 includes a plurality of raster lines RL spaced at substantially regular intervals aF in the sub-scanning direction SD. The actual interval aF is identical to the actual conveyance amount in one sub scan (hereinafter the interval aF will be referred to as the "actual conveyance amount aF"). The actual conveyance amounts aF include various errors, such as error caused by imprecision in the operation of the medium conveying unit 258 (see FIG. 1) due to the printing medium PM sliding against the conveying roller (not shown), for example. Such error consequently produces variation among actual conveyance amounts aF.

In S510 the MFP 200 measures the actual conveyance amounts aF. Any method may be used to measure the actual conveyance amounts aF. For example, image data representing the test chart CT may be generated by optically reading the test chart CT, and the actual conveyance amounts aF may be calculated by analyzing this image data. In S510 the CPU 210 obtains a plurality of actual conveyance amounts aF that vary due to error.

In S520 the CPU 210 acquires a difference aE between a target conveyance amount tF and the actual conveyance amount aF. The target conveyance amount tF is the target value for a sub scan conveyance amount. The actual conveyance amount aF may differ from the target conveyance amount tF due to error. The difference aE indicates the amount of this error. A histogram HG2 shown in FIG. 5 plots the distribution of these differences aE. As shown in the graph, the distribution of differences aE is roughly a normal distribution (the average is approximately zero).

In S530 the CPU 210 calculates the actual error aEf from the plurality of differences aE. The actual error aEf is a representative value of the differences aE. In the preferred embodiment, the actual error aEf is set so that there are almost no differences aE whose absolute value exceeds the actual error aEf. That is, the actual error aEf is set so that the absolute value of error in the conveyance amount produced by the MFP 200 in future printing operations will almost never exceed the actual error aEf. Any of a variety of methods employing a statistical process may be employed to set the actual error aEf. For example, the actual error aEf may be set to a value three times the standard deviation of the differences aE, as in a first method MT1 shown in FIG. 5. In this case, the probability that the absolute value of an difference aE is contained within the actual error aEf is 99.7%. Alternatively, the actual error aEf may be set to the maximum absolute value of differences aE, as in the second method MT2 shown in FIG. 5. Still another method indicated by the third method MT3 in FIG. 5 is to set the actual error aEf using a prediction interval with 95% confidence. In the latter case, in S590 the CPU 210 calculates an upper limit of the prediction interval for differences aE (hereinafter referred to as the "upper limit PU"), and in S592 calculates a lower limit of the prediction interval for differences aE (hereinafter referred to as the "lower limit PL"). In S594 the CPU 210 determines whether the absolute value of the upper limit PU is greater than the absolute value of the lower limit PL, and in S596 or S598 sets the actual error aEf to the larger of the absolute values. The actual error data 236 representing the actual error aEf set in FIG. 5 is stored in the nonvolatile memory 230. In the preferred embodiment, the actual error data 236 is set for each individual MFP 200. However, the actual error data 236 may instead be set for each model of the MFP 200 since the actual error aEf is generally about the same for individual MEPs 200 of the same model.

Next, the process in S410-S470 of FIG. 4 is performed to identify the two-pass range using the actual error aEf calculated above. In S410 a target input gradation value Vip is initialized to 0. As will be described later, the target input gradation value Vip is shifted from 0 to 255 by increments of 1 in order to process each possible value of the input gradation value Vi (the 256 values from 0 to 255 in the preferred embodiment).

In S420 the CPU 210 calculates the acceptable error Efa corresponding to the target input gradation value Vip based on the first acceptable error data 238. That is, in S420 the acceptable error Efa corresponding to the target input gradation value Vip (hereinafter referred to as the "target acceptable error Efp") is calculated based on the first curve 238c. In S430 the operator determines whether the target acceptable error Efp is greater than the actual error aEf. If the target acceptable error Efp is greater than the actual error aEf (S430: YES), in S440 the CPU 210 determines that the target input gradation value Vip is included in the two-pass range. However, if the target acceptable error Efp is less than or equal to the actual error aEf (S430: NO), in S450 the CPU 210 determines that the target input gradation value Vip is not included in the two-pass printing (is included in the four-pass range).

Thereafter, the process in S470 for incrementing the target input gradation value Vip by 1 and the process in S420, S430, S440, and S450 for determining the pass number for the next target input gradation value Vip is repeated until all input gradation values Vi have been processed (S460: YES). As a result, a pass number is set for each input gradation value Vi.

In the fourth graph GF14 on the bottom of FIG. 4, the range of input gradation values Vi is divided into three ranges VRa1, VRb1, VRc1 in the preferred embodiment. The first range VRa1 and third range VRc1 together constitute the two-pass range, and the second range VRb1 is the four-pass range.

Two-pass printing is allowable (i.e., the actual error aEf is acceptable) in the dark (high-density) first range VRa1 for the following reason. Since ink dots are arranged at a high density in dark regions, adjacent ink dots are formed so as to overlap each other. Consequently, an exposed portion pp, such as that shown in FIG. 2, is less likely to produced, even when deviation occurs in the formation positions of ink dots, thereby increasing the acceptable error Efa.

Two-pass printing is allowable (i.e., the actual error aEf is acceptable) in the bright (low-density) third range VRc1 for the following reason. Since ink dots are arranged at a low density in bright regions, the ink dots are spaced at a greater distance from each other. Consequently, there is little chance for unexpected overlap between ink dots, even when deviation occurs in the formation positions of ink dots, resulting in a larger acceptable error Efa.

Two-pass printing is not allowed (i.e., the actual error aEf is not acceptable) in the second range VRb1 between the first range VRa1 and third range VRc1 for the following reason. Specifically, in areas that are neither bright nor dark, adjacent ink dots are formed with a small distance therebetween so as not to overlap. Consequently, unintended overlap between ink dots tends to occur when there is deviation in the formation positions of the ink dots, which tends to expand the exposed portion pp and reduce the acceptable error Efa.

The pass number determination unit M220 (see FIG. 1) sets the number of main scans (pass number) according to the procedure in FIG. 4. Here, in place of the process in S400, the pass number determination unit M220 performs a process to acquire the actual error data 236 from the nonvolatile memory 230. However, the method of setting the pass number with the pass number determination unit M220 is not limited to the procedure in FIG. 4, but may be any of a variety of methods that use the representative input gradation values Vir, the actual error data 236 (actual error aEf), and the first acceptable error data 238. For example, the pass number determination unit M220 may identify the two-pass and four-pass ranges from the actual error aEf and the first acceptable error data 238 and may set the pass number to "2" when the representative input gradation value Vir is included in the two-pass range, and to "4" when the representative, input gradation value Vir is included in the four-pass range (hereinafter, this method will be referred to as the "first setting method"). Alternatively, the pass number determination unit M220 may calculate the acceptable error Efa associated with the representative input gradation value Vir using the first acceptable error data 238, and may set the pass number to "2" when the actual error aEf is less than or equal to the calculated acceptable error Efa, and "4" when the actual error aEf is greater than the acceptable error Efa (hereinafter, this method will be referred to as the "second setting method"). The same results are ultimately derived from both the first and second setting methods. Therefore, execution of the first setting method is the same as execution of the second setting method. A sample process performed by the pass number determination unit M220 during a printing operation will be described later in greater detail.

As described above in the first embodiment, the actual error aEf in the conveyance amount can be incorporated into the pass number so that a pass number suited to the actual error aEf can be set, even when there is individual variability in the actual error aEf. In other words, the number of main scans can be set to a value appropriate for the print execution unit 250. Further, since the representative input gradation value Vir can be incorporated into the pass number, it is possible to set a pass number suited to the image being printed. Therefore, the MFP 200 according to the first embodiment can set the pass number for completing the printing of the partial area PA to a value suited to both the print execution unit 250 and the image being printed.

Relationship between the Actual Error and the Two-Pass Ranges of Representative Input Gradation Values Vir: Bottom of FIG. 4

Next, the relationships between the actual error aEf specified by the actual error data 236 and the two-pass ranges of representative input gradation values Vir will be described. A fifth graph GF15 is shown in the bottom of FIG. 4. The fifth graph GF15 shows changes in the two-pass ranges in response to changes in the actual error aEf. The fifth graph GF15 indicates the first curve 238c and two actual errors aEf1 and aEf2. The second actual error aEf2 is greater than the first actual error aEf1. Three ranges VRa11, VRb11, and VRc11 indicated in an upper level specify ranges set according to the first actual error aEf1. The first range VRa11 and the third range VRc11 taken together constitute the two-pass range, while the second range VRb11 is the four-pass range. Three ranges VRa12, VRb12, and VRc12 indicated in a lower level specify ranges set according to the second actual error aEf2. The first range VRa12 and the third range VRc12 taken together constitute the two-pass range, while the second range VRb12 is the four-pass range.

As shown in the graph, the two-pass range is narrower when the actual error aEf is large (the second actual error aEf2) than when the actual error aEf is small (the first actual error aEf1). As a result, printing can be performed faster when the actual error aEf is small since the two-pass range is wider, but problems in image quality can be suppressed when the actual error aEf is large, since the two-pass range is narrow and the four-pass range is wide. By appropriately incorporating the actual error aEf in conveyance amount into the pass number, it is possible to set the pass number for completing printing of the partial area PA on a printing medium PM to a value suitable for both the print execution unit 250 and the image being printed.

Further, in the first embodiment, the estimated color difference edE to be compared to the first threshold dEth1 is estimated using the colorimetric values of a plurality of patches PT (see FIG. 2), thereby appropriately suppressing visible color differences caused by error in conveyance amounts. Further, since the second correlations between the conveyance errors Ef and the dot coverage CR is identified through simulations (see FIG. 3), colorimetric values Lab corresponding to various conveyance errors Ef can be easily estimated (including colorimetric values Lab correlated with a small conveyance error Ef that is difficult to control, for example), enabling a suitable pass number to be established.

As described with reference to S220 of FIG. 2, the process of measuring the dot coverage CR of a printed patch PT includes the following steps: (1) setting the threshold Th to the valley V between the first peak dtp (representing the ink dots dt) and the second peak ppp (representing the exposed portion pp); and (2) classifying pixels in the second image data IM2d as pixels representing ink dots dt and pixels representing the exposed portion pp (the printing medium PM) using the threshold Th. Accordingly, pixels can be appropriately sorted, even when the brightness value of the valley V varies according to imaging conditions and the like, making it possible to calculate the dot coverage CR appropriately.

Figure 6:
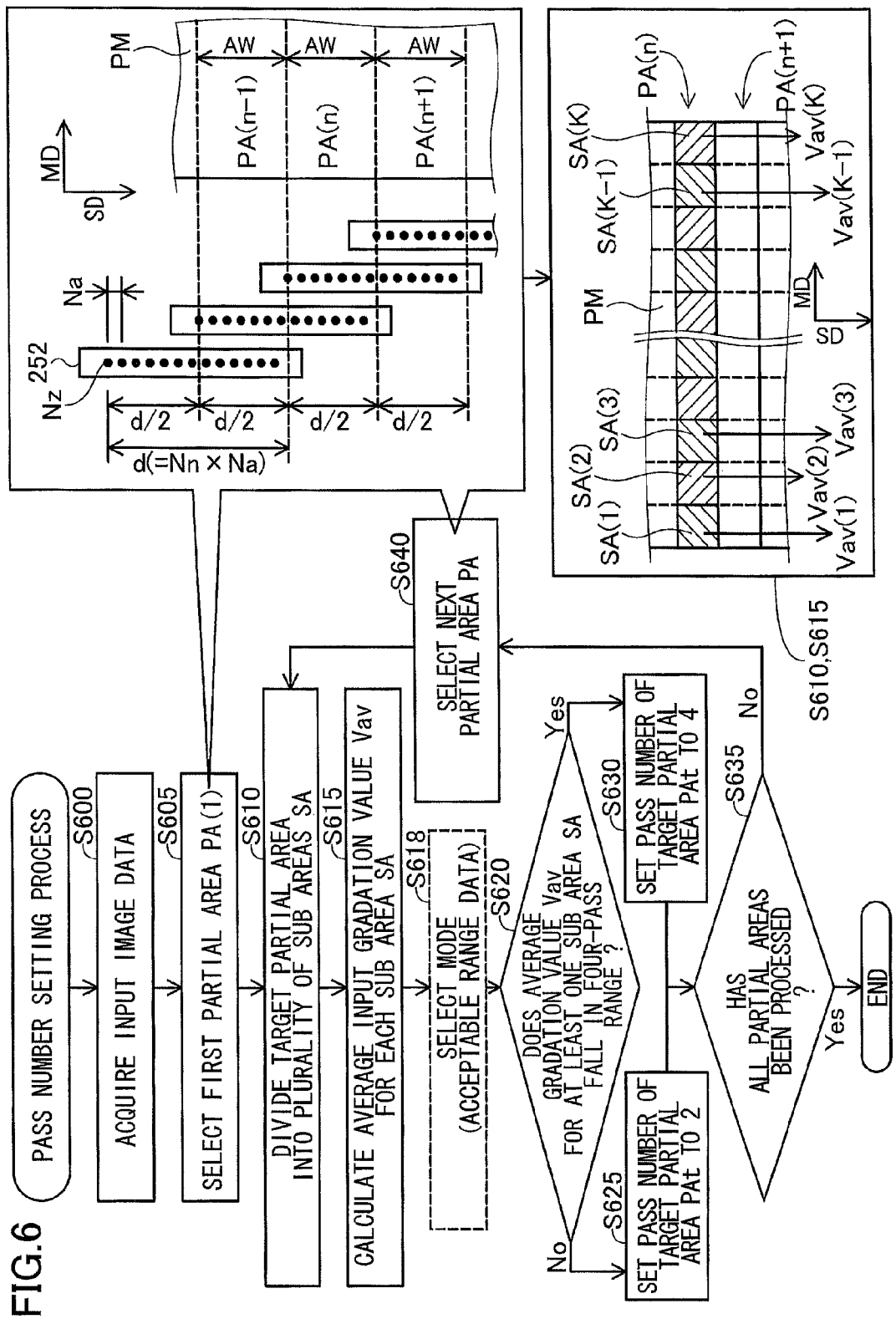
FIG. 6 is an explanatory diagram illustrating a pass number setting process according to the first embodiment.

Pass Number Setting Process: FIG. 6

Next, a pass number setting process for setting the pass number for each printing area of print data will be described with reference to FIG. 6. FIG. 6 is a flowchart illustrating steps in the pass number setting process executed by the print process unit M200 (FIG. 1). In the pass number setting process, the print process unit M200 divides a single partial area PA into a plurality of sub areas SA and sets the pass number for the partial area PA based on the average value of input gradation values Vi for each of the sub areas SA. Note that step S618 indicated by a dashed line in FIG. 6 is executed in the eighth embodiment described later and will be omitted from this description.

FIG. 6 also includes a conceptual drawing of the printing medium PM and the print head 252. The print head 252 includes a plurality of nozzles Nz arranged at a constant pitch Na in the sub-scanning direction SD. In the example of FIG. 6, the nozzles Nz are arranged linearly along the sub-scanning direction SD, but the positions of the nozzles Nz may differ in the main scanning direction MD. The value Nn indicates the total number of nozzles Nz. The total number Nn is odd in the preferred embodiment. A head length d shown in FIG. 6 is equivalent to the total number Nn of nozzles Nz*the pitch Na (where "*" is the multiplication operand). The width of each partial area PA in the sub-scanning direction SD (hereinafter referred to as the "area width AW") is half the head length d (d12). The above description covers the plurality of nozzles Nz used for one ink color (called a "nozzle set"). Since the MFP 200 uses a plurality of ink colors, the print head 252 has a plurality of nozzle sets, each arranged at the same position in the sub-scanning direction SD. A sample process for one ink color will be described below, but the following process is executed identically for each ink color.

In S600 at the beginning of the flowchart in FIG. 6, the pass number determination unit M220 acquires input image data for printing. In S605 the pass number determination unit M220 selects a first partial area PA from among the plurality of partial areas PA arranged in the printing medium PM as the process target (hereinafter referred to as the "target partial area PAt"). The first partial area PA is positioned farthest on the upstream side. The notation PA(m) will be used to identify individual partial areas PA in the following description. The integer m will be an ascending number beginning from "1", where "1" is assigned to the partial area PA positioned farthest toward the upstream side and the integer m is continuously incremented by 1 from the upstream side toward the downstream side.

In S610 the pass number determination unit M220 divides the target partial area PAt into a plurality of sub areas SA. FIG. 6 shows a conceptual view of a partial area PA(n). This partial area PA(n) is divided into a plurality of sub areas SA(i), where i is an integer identifying individual sub areas SA. In the preferred embodiment, the target partial area PAt is divided equally in the main scanning direction MD, producing sub areas SA in the target partial area PAt that are juxtaposed in the main scanning direction MD and have the same shape. However, any of various configurations for the shape and arrangement of the sub areas SA may be employed. For example, the partial area PA may be divided into a plurality of sub areas SA along the sub-scanning direction SD, as well as the main scanning direction MD.

In S615 the pass number determination unit M220 calculates the average input gradation value Vi for each sub area SA (hereinafter referred to as the "average gradation value Vav"). In S620 the pass number determination unit M220 determines whether the average gradation value Vav for at least one sub area SA in the target partial area PAt falls in the four-pass range (the second range VRb1 in FIGS. 1 and 4, for example) using the same procedure described with reference to FIG. 4. If the average gradation values Vav for all sub areas SA in the target partial area PAt fall within the two-pass range (S620: NO), in S625 the pass number determination unit M220 sets the pass number for the target partial area PAt to "2". However, if the average gradation value Vav for one or more sub areas SA falls in the four-pass range (S620: YES), in S630 the pass number determination unit M220 sets the pass number for the target partial area PAt to "4".

Thereafter, the pass number determination unit M220 repeatedly executes step S640 to select the next partial area PA as the target partial area PAt and steps S610-S630 to set a pass number for the next partial area PA until the process has been completed for all partial areas PA (S635: YES). Through this process, the pass number determination unit M220 sets pass numbers for all partial areas PA.

The above description covers the process for setting pass numbers for one ink color. The pass number determination unit M220 sets a pass number for each ink color in a single partial area PA. If the pass number is set to "4" for at least one ink color, ultimately the pass number determination unit M220 sets the pass number for the partial area PA to "4". If the pass number is set to "2" for all ink colors, the pass number determination unit M220 ultimately sets the pass number for the partial area PA to "2". As described above, any of a variety of methods may be used to set the number of main scans for one partial area PA when printing is performed with a plurality of ink colors.

In the above description, the pass number determination unit M220 sets the pass number for a partial area PA using the average gradation value Vav for each of a plurality of sub areas SA obtained by dividing the partial area PA. Therefore, if one part of the partial area PA represents an image that is not suited to two-pass printing, the pass number determination unit M220 can appropriately set the pass number to "4" for this partial area PA. Here, the average gradation values Vav for all sub areas SA are an example of the representative input gradation value. Thus, the representative input gradation value is said to fall within the two-pass range when all average gradation values Vav fall within the two-pass range, and the representative input gradation value is said not to fall within the two-pass range when one or more average gradation values Vav does not fall within the two-pass range.

Figure 7:
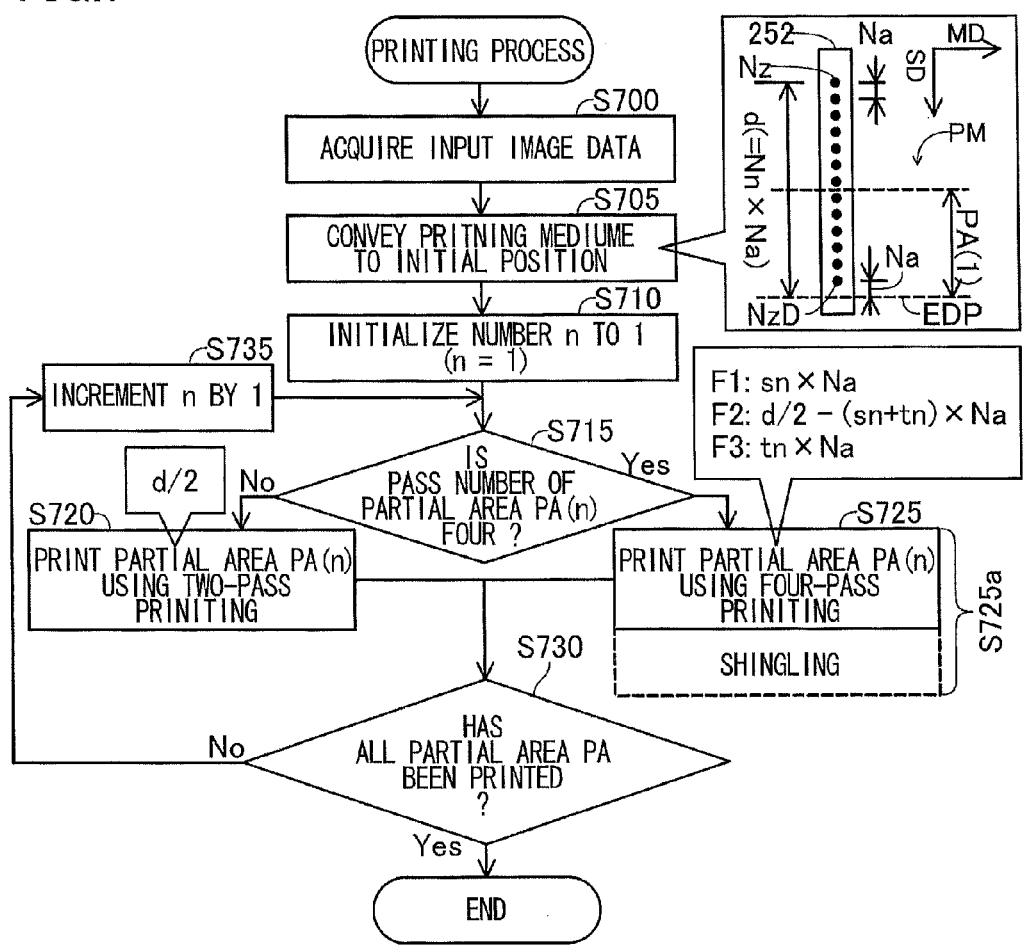
FIG. 7 is an explanatory diagram illustrating a printing process according to the first embodiment.

Printing Process: FIG. 7

FIG. 7 is a flowchart illustrating steps in a printing process executed by the multi-pass execution unit M210. In FIG. 7, step S725a indicated by a dashed line is executed in the fourth embodiment described later and will be omitted from the following description.

In S700 at the beginning of FIG. 7, the multi-pass execution unit M210 acquires input image data. In S705 the multi-pass execution unit M210 conveys the printing medium PM to an initial position. The diagram in the upper right of FIG. 7 shows the positional relationship of the partial area PA(1) and the print head 252 when the printing medium PM has been conveyed to the initial position.

When the printing medium PM has been conveyed to the initial position, a downstream-most nozzle NzD, which is the nozzle positioned farthest downstream in the sub-scanning direction SD, is at a position shifted exactly one pitch Na upstream from a downstream end EDP of the partial area PA(1). In other words, the nozzles positioned on the downstream side with respect to the sub-scanning direction SD are distributed along substantially the entire partial area PA(1) in the sub-scanning direction SD.

In S710 of FIG. 7, the multi-pass execution unit M210 initializes a number n to 1, where n serves to identify the partial area PA that is the current process target.

In S715 the multi-pass execution unit M210 determines whether the pass number for the partial area PA(n) identified by the number n is "4". If the pass number is not "4" (i.e., when the pass number is "2" in this example), in S720 the multi-pass execution unit M210 prints the partial area PA(n) using two-pass printing. In this case, the multi-pass execution unit M210 performs a sub scan between the first main scan and the second main scan. The conveyance amount for the sub scan is half the head length (d/2). Two-pass printing will be described later in greater detail.

However, when the pass number is "4", in S725 the multi-pass execution unit M210 prints the partial area PA(n) using four-pass printing. The multi-pass execution unit M210 performs four main scans while repeatedly alternating main scans and sub scans. The conveyance amount for each of the three sub scans executed between the four main scans is as follows.

First conveyance amount $F1$=first value $sn$*pitch $Na$

Second conveyance amount $F2=d/2-$(first value $sn$+second value $tn$)*pitch $Na$ Third conveyance amount $F3$=second value $tn$*pitch $Na$ The first value sn and second value tn are integers of 1 or greater that satisfy the expression "d/2>(first value sn+second value tn)*pitch Na". The sum of the three conveyance amounts F1, F2, and F3 is equivalent to d/2 (i.e., the area width AW). Note that the order of these conveyance distances is not limited to the F1→F2→F3 order, but may be any desired order. Four pass printing will be described later in greater detail.

Thereafter, the multi-pass execution unit M210 repeatedly executes step S735 for incrementing the number n by 1 and steps S715, S720, and S725 for performing a print until all partial areas PA have been printed (S730: YES). At this point, the printing process ends.

Figure 8:
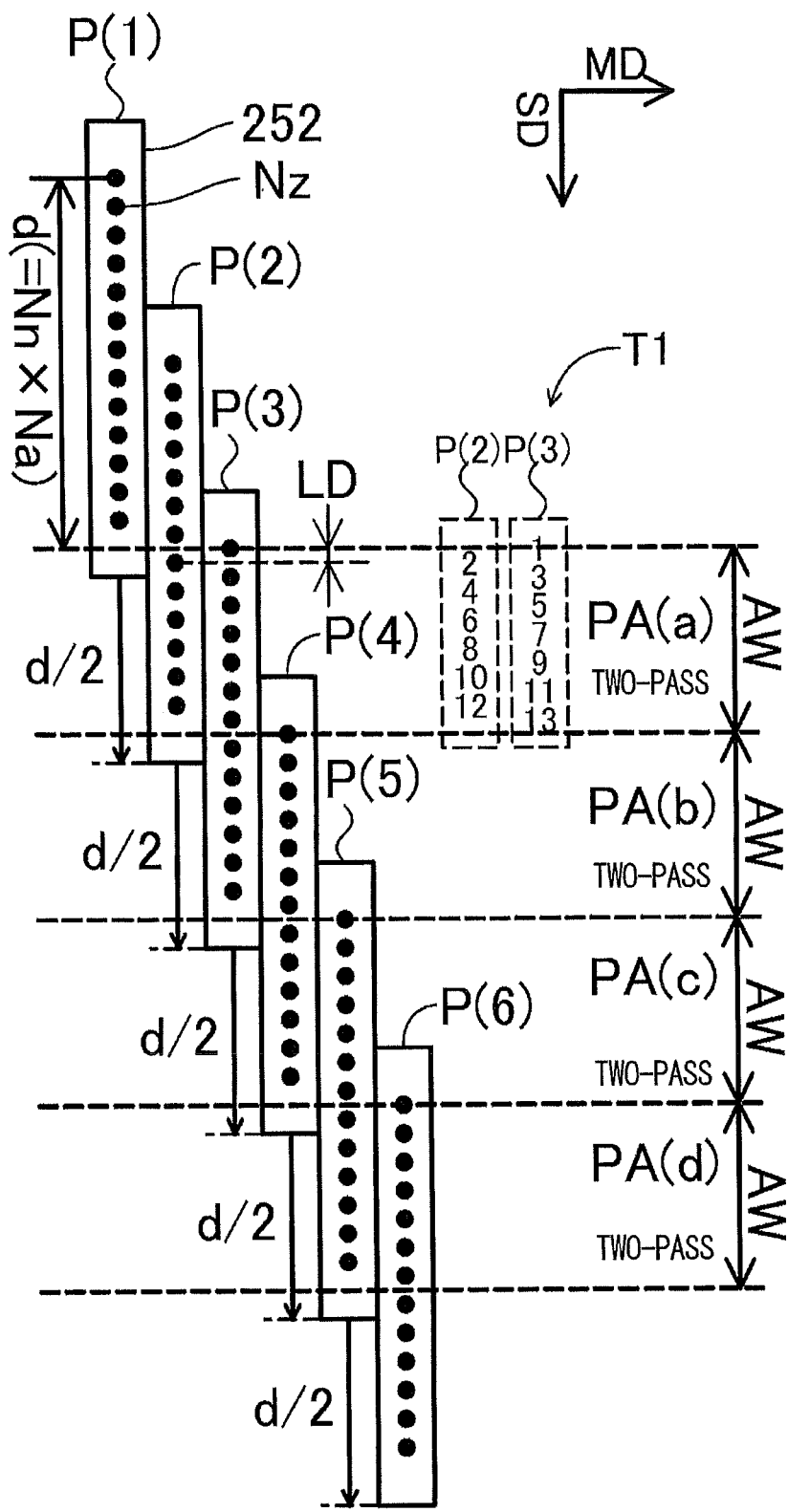
FIG. 8 is an explanatory diagram showing an example of two-pass printing according to the first embodiment.

Example of Two-Pass Printing: FIG. 8

FIG. 8 is an explanatory diagram showing an example of two-pass printing. FIG. 8 shows the position of the print head 252 (nozzles Nz) in the sub-scanning direction SD for each of a plurality of passes. Here, the notation P(m) is used to identify individual passes, where m is an integer indicating the order of each pass executed in the drawing. FIG. 8 also shows four partial areas PA(a)-Pa(d) arranged in order from the upstream side to the downstream side. A pass number of "2" is used for all partial areas PA(a)-Pa(d) in FIG. 8.

The total number Nn of nozzles Nz in the preferred embodiment is 13. Sub scans of the same conveyance amount are repeatedly performed when a plurality of partial areas PA having the pass number "2" are arranged consecutively. In the printing example of FIG. 8, the conveyance amount for the sub scan is half the head length d (total number Nn*pitch Na). In the preferred embodiment, the total number Nn of nozzles Nz is odd. Therefore, the positions of the nozzles Nz in a main scan relative to the sub-scanning direction SD overlap the positions shifted the pitch Na/2 from the positions of the nozzles Nz in the preceding main scan. As a result, the plurality of raster lines is printed in two consecutive main scans such that an interval LD in the sub-scanning direction SD is the pitch Na/2. In the example of FIG. 8, all of the nozzles Nz print in each main scan.

In FIG. 8, a single partial area PA is printed in two consecutive main scans. For example, the first partial area PA(a) is printed with a second pass P(2) and a third pass P(3). Table T1 in FIG. 8 shows the relationship between the raster line numbers in the first partial area PA(a) and the passes with which the raster line is printed. The raster line number is assigned in order beginning from "1" at the upstream side in the sub-scanning direction SD toward the downstream side. As shown in the Table T1, the second pass P(2) prints even-numbered raster lines, while the third pass P(3) prints odd-numbered raster lines, thereby performing interlace printing. Accordingly, adverse effects caused by error in conveyance amounts (adverse effects on image quality) can be dispersed.

In the preferred embodiment, the head length d of the print head 252 is the same as the length of two consecutive partial areas PA in the sub-scanning direction SD. Hence, the print head 252 can print two partial areas PA along their entire range in the sub-scanning direction SD using one main scan. In the printing example of FIG. 8, the third pass P(3) prints the first partial area PA(a) and the second partial area PA(b) along their entire range in the sub-scanning direction SD. Further, the partial area PA opposing the print head 252 (the nozzles Nz) is shifted downstream by the sub scans in two-pass printing. Here, the conveyance amount in a sub scan performed in two-pass printing is equivalent to the area width AW of one partial area PA. Therefore, the relative positions in the sub-scanning direction SD of the partial area PA opposing the print head 252 and the nozzles Nz is the same before and after a sub scan. For example, the positions of the nozzles Nz in the second pass P(2) relative to the first partial area PA(a) in the sub-scanning direction SD is the same as the positions of the nozzles Nz in the third pass P(3) relative to the second partial area PA(b) in the sub-scanning direction SD. Therefore, the last pass in two-pass printing for the $n^{th}$ partial area PA(n) can also execute the initial pass in two-pass printing for the $(n+1)^{th}$ partial area PA(n+1). As a result, by repeating main scans and sub scans, the print head 252 can perform two-pass printing for each partial area PA while printing two partial areas PA simultaneously.

Figure 9:
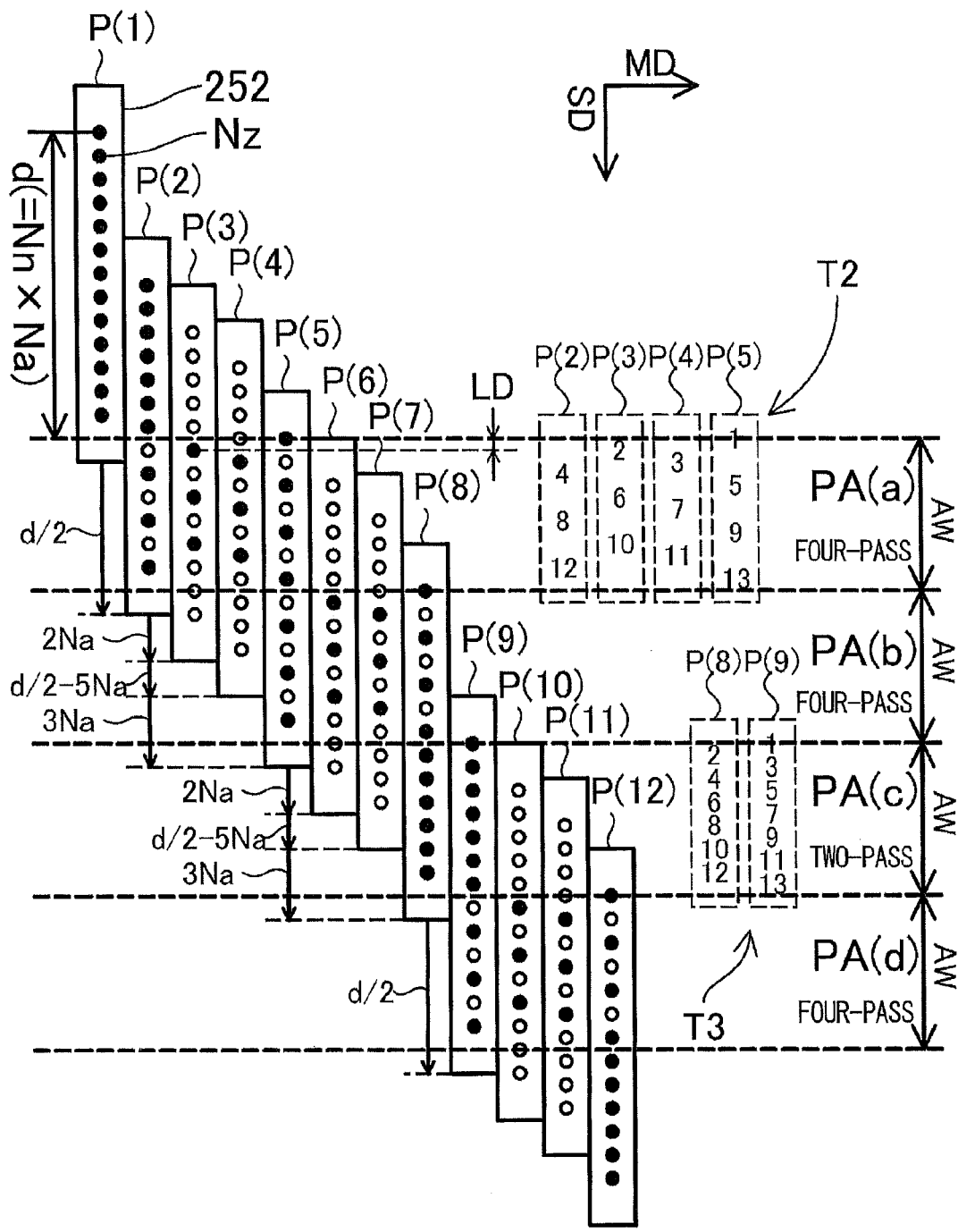
FIG. 9 is an explanatory diagram showing an example of four-pass printing according to the first embodiment.

Example of Four-Pass Printing: FIG. 9

FIG. 9 is an explanatory diagram showing an example of four-pass printing. As in FIG. 8, the print head 252 (the nozzles Nz) is shown at positions in the sub-scanning direction SD during a plurality of passes P(1)-P(12), and four partial areas PA(a)-Pa(d) are arranged in their order from the upstream side toward the downstream side. In FIG. 9, the third partial area PA(c) has a pass number of "2", while the other partial areas PA(a), PA(b), and PA(d) have a pass number of "4". The printing example in FIG. 9 uses only a portion of the nozzles Nz in a single main scan. Filled circles in FIG. 9 indicate the nozzles Nz used for printing, while unfilled circles indicate unused nozzles Nz.

The partial areas PA having a pass number of "4" are printed through four consecutive main scans. For example, the first partial area PA(a) is printed in the four passes P(2)-P(5). FIG. 9 also includes a second table T2 showing the relationship between raster line numbers in the first partial area PA(a) and the passes in which the raster lines are printed. In the example of FIG. 9, the second pass P(2) prints raster lines 4, 8, and 12; the third pass P(3) prints raster lines 2, 6, and 10; the fourth pass P(4) prints raster lines 3, 7, and 11; and the fifth pass P(5) prints raster lines 1, 5, 9, and 13, achieving interlace printing. Accordingly, adverse effects caused by error in conveyance amounts (adversely affecting image quality) can be dispersed.

Three sub scans are performed between passes P(2)-P(5). In the example of FIG. 9, the first value sn is "2" and the second value to is "3" in the equations for calculating the conveyance amounts F1-F3 described above. Hence, conveyance amounts in sub scans between the second pass P(2) and the fifth pass P(5) change in order from "2*pitch Na," "d/2−5*pitch Na," and "3*pitch Na."

The conveyance amount between the second pass P(2) and third pass P(3) is an integer multiple of the pitch Na. Therefore, the second pass P(2) and third pass P(3) can print the same raster line. In the printing example of FIG. 9, the second pass P(2) uses alternate nozzles Nz, and the third pass P(3) uses alternate nozzles Nz for printing portions of the raster line not printed in the second pass P(2). When a plurality of main scans (a plurality of nozzles Nz) can print a single common raster line in this way, some of the main scans do not print the raster line, while the remainder of the main scans print the raster line. This technique is called "complementary printing." By combining interlace printing with complementary printing, as in the example of FIG. 9, the adverse effects caused by error in conveyance amounts (adversely affecting image quality) can be further dispersed. The fourth pass P(4) and fifth pass P(5) similarly perform complementary printing.

The conveyance amount between the third pass P(3) and fourth pass P(4) is equivalent to an integer multiple of the pitch Na plus one-half the pitch Na. Hence, the positions of the nozzles Nz in the fourth pass P(4) relative to the sub-scanning direction SD overlap positions shifted the pitch Na/2 from the positions of the nozzles Nz in the third pass P(3). Thus, the third pass P(3) and fourth pass P(4) can print a plurality of raster lines at intervals LD in the sub-scanning direction SD equivalent to the pitch Na/2. Hence, the printing resolution in the sub-scanning direction SD is the same between two-pass printing and four-pass printing.

Further, the total conveyance amount for three sub scans in four-pass printing is d/2, which is equivalent to the area width AW of one partial area PA. That is, the three sub scans between four main scans in four-pass printing together achieve movement over a distance corresponding to a single partial area PA. Therefore, for every three sub scans performed in four-pass printing, the partial area PA opposing the print head 252 (the nozzles Nz) can be shifted downstream so that the positional relationship between the partial area PA opposing the print head 252 and the nozzles Nz does not change relative to the sub-scanning direction SD. For example, the positions of the nozzles Nz in the second pass P(2) relative to the first partial area PA(a) in the sub-scanning direction SD is identical to the positions of the nozzles Nz in the fifth pass P(5) relative to the second partial area PA(b) in the sub-scanning direction SD. In this method, the last path for the $n^{th}$ partial area PA(n) in four-pass printing also implements the initial pass of the $(n+1)^{th}$ partial area PA(n+1). Therefore, by repeatedly executing sub scans and main scans, the print head 252 can perform four-pass printing in each partial area PA while simultaneously printing two adjacent partial areas PA.

In the first embodiment, the conveyance amount of a sub scan in two-pass printing is identical to the sum of conveyance amounts of the sub scans in four-pass printing (the area width AW). Therefore, by repeating main scans and sub scans, the print head 252 can perform multi-pass printing of each partial area PA while simultaneously printing two partial areas PA, even when transitioning from one of the two-pass and four-pass partial areas PA to the other. For example, the final pass for the second partial area PA(b) in four-pass printing (the eighth pass P(8)) implements the initial pass for the third partial area PA(c) in two-pass printing (the eighth pass P(8)). Similar, the final of the two passes for the third partial area PA(c) (the ninth pass P(9)) serves to implement the initial pass of the four passes for the fourth partial area PA(d) (the ninth pass P(9)).

Note that the relative positional relationship between the nozzles Nz and a $n^{th}$ partial area PA(n) in the sub-scanning direction SD when performing an initial pass (main scan) for the $n^{th}$ partial area PA(n) in multi-pass printing is identical to the relative positions of the nozzles Nz and partial area PA(1) in the sub-scanning direction SD during the initial position shown in FIG. 7.

The third partial area PA(c) is printed the same way that the first partial area PA(a) is printed in FIG. 8. As shown in a third table T3 in FIG. 9, the eighth pass P(8) prints even-numbered raster lines, while the ninth pass P(9) prints odd-numbered raster lines. The second partial area PA(b) and the fourth partial area PA(d) are printed the same as the first partial area PA(a).

In the first embodiment described above, interlace printing is used in both two-pass printing and four-pass printing, thereby dispersing adverse effects caused by error in conveyance amounts (adversely affecting image quality). Further, by combining interlace printing with complementary printing in four-pass printing, it is possible to further disperse these adverse effects. In addition, the sub scan conveyance amount in two-pass printing is identical to the sum of conveyance amounts for sub scans in four-pass printing (the area width AW). Therefore, regardless of the number of passes used in printing each partial area, the final pass for an $n^{th}$ partial area PA(n) in multi-pass printing is a shared pass used for implementing the initial pass of the $(n+1)^{th}$ partial area PA(n+1). Thus, even when pass numbers are set differently for each partial area, this method can achieve faster printing than when using a special printing process for transitioning between two partial areas having different pass numbers. The processes described in FIGS. 6 and 7 may also be performed in parallel.

B. Second Embodiment

Figure 10:
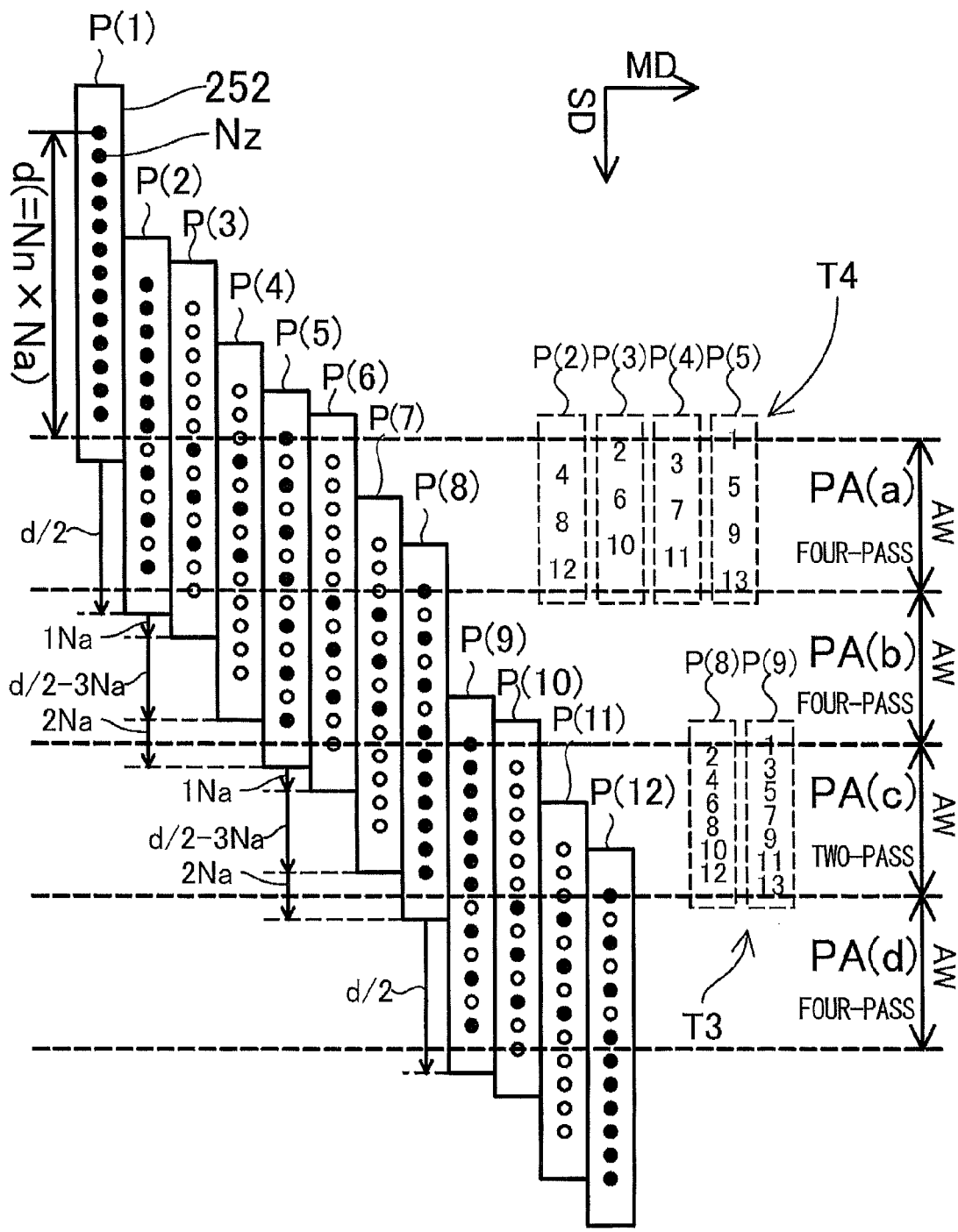
FIG. 10 is an explanatory diagram showing an example of four-pass printing according to a second embodiment of the present invention.

FIG. 10 is an explanatory diagram showing another example of four-pass printing. This example differs from the printing example in FIG. 9 only in that the first value sn is set to "1" and the tn to "2" for calculating the conveyance amounts F1-F3 described above. As in the example of FIG. 9, the first partial area PA(a) is printed using the second through fifth passes P(2)-P(5). As illustrated in a fourth table T4, the raster lines printed in each pass are identical to the example in FIG. 9. Further, the sum of the conveyance amounts "1*pitch Na," "d/2−3*pitch Na," and "2*pitch Na" for the three sub scans is equivalent to the area width AW of a single partial area PA. Hence, when printing two adjacent partial areas, the final pass of the first partial area being printed serves to implement the initial pass for the partial area being printed next. The third partial area PA(c) is printed according to the example described in FIG. 9. Note that various other combinations of the first value sn and second value tn may be employed.

C. Third Embodiment

Figure 11:
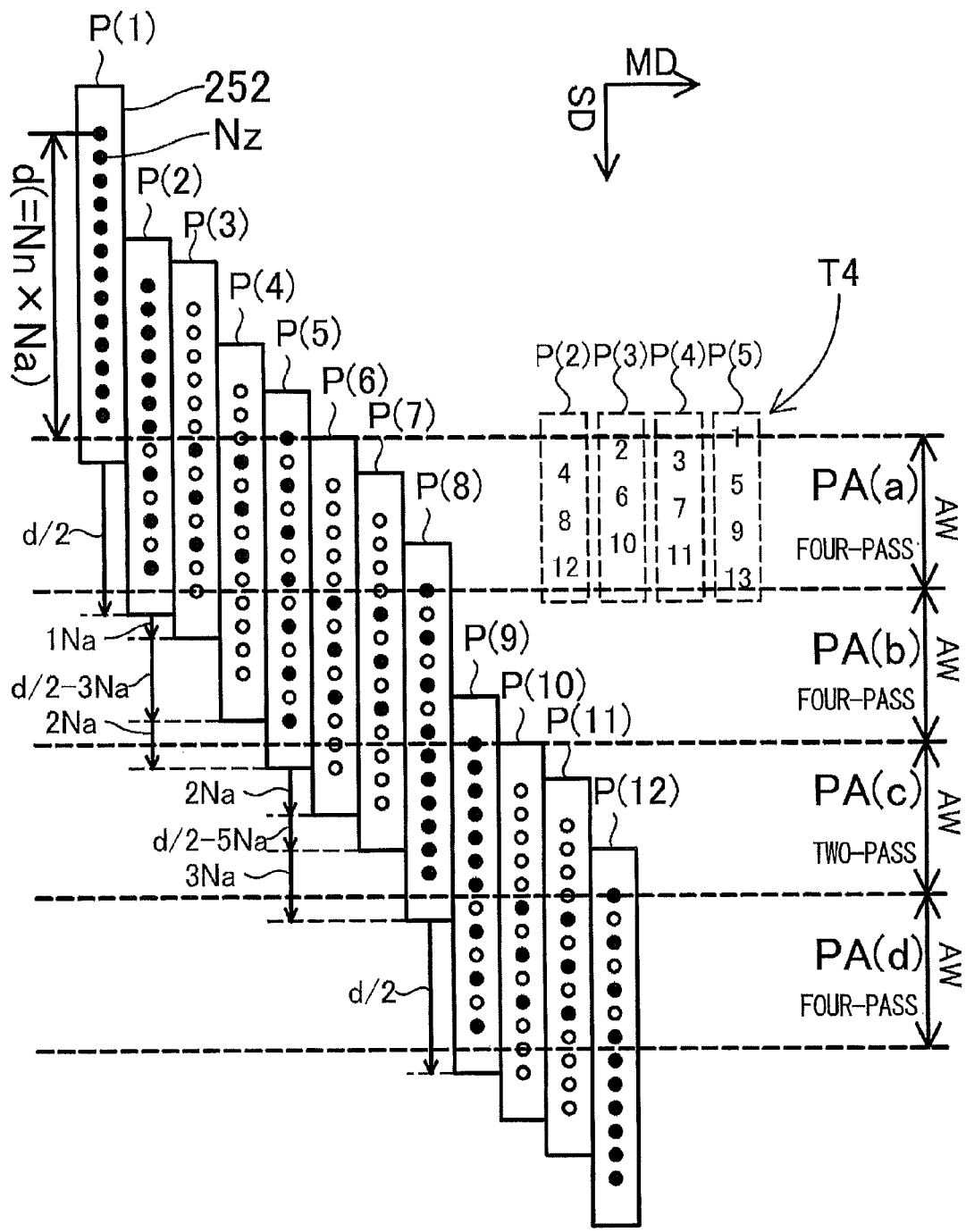
FIG. 11 is an explanatory diagram showing an example of four-pass printing according to a third embodiment of the present invention.

FIG. 11 is an explanatory diagram showing another example of four-pass printing. This example differs from the printing examples in FIGS. 9 and 10 in the conveyance amounts of the sub scans. Specifically, the first partial area PA(a) in the example of FIG. 11 is printed according to the same four-pass printing method shown in FIG. 10, while the second partial area PA(b) is printed according to the same four-pass printing method used in FIG. 9. Accordingly, the sub scan conveyance amounts differ among partial areas PA having the same pass numbers.

D. Fourth Embodiment

In the fourth embodiment, the multi-pass execution unit M210 executes a printing process according to the flowchart in FIG. 7, when step S275a is included. In four-pass printing, the multi-pass execution unit M210 prints a single raster line using a plurality of nozzles (referred to as "shingling").

Figure 12:
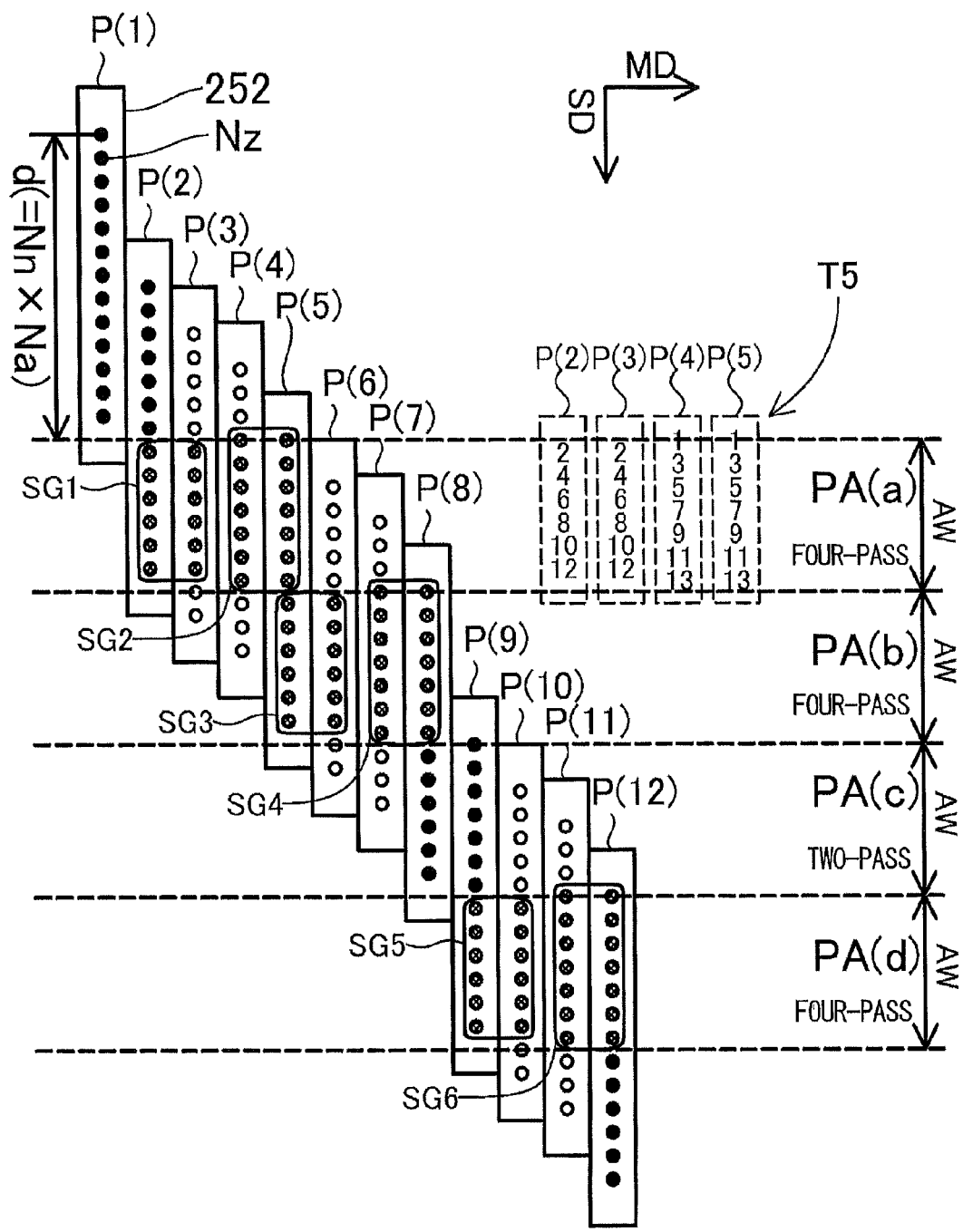
FIG. 12 is an explanatory diagram showing an example of four-pass printing (shingling) according to a fourth embodiment of the present invention.

FIG. 12 is an explanatory diagram illustrating an example of four-pass printing according to the fourth embodiment. The method in FIG. 12 differs from the printing method described with reference to FIG. 9 in that shingling is performed in four-pass printing instead of complementary printing. As shown in FIG. 12, the nozzles Nz used for shingling are arranged in groups SG1-SG6. For example, the first group SG1 includes nozzles used in the second pass P(2) and the third pass P(3), while the second group SG2 includes nozzles used in the fourth pass P(4) and the fifth pass P(5). The first partial area PA(a) is printed through shingling using these groups SG1 and SG2.

FIG. 12 includes a fifth table T5 showing the relationship between raster line numbers in the first partial area PA(a) and the passes that print these raster lines (P(2)-P(5)). As can be seen from the fifth table T5, the second pass P(2) and third pass P(3) print even-numbered raster lines, while the fourth pass P(4) and fifth pass P(5) print odd-numbered raster lines. As an example, the nozzles Nz in the second pass P(2) form ink dots at some of the pixel positions in the second raster line, and the nozzles Nz in the third pass P(3) form ink dots at the remaining pixel positions in the second raster line. Accordingly, a plurality of nozzles Nz is used to print a single raster line. Note that any of a variety of methods may be employed to set shared printing assignments (to assign pixel positions) for each of the main scans. For example, random numbers may be used to assign pixel positions. Alternatively, assignments may be set so that a plurality of main scans is repeated in order each time the plurality of pixel positions of a single raster line are printed from one end to the other.

The second partial area PA(b) and fourth partial area PA(d) are printed in the same manner as the first partial area PA(a), while the third partial area PA(c) is printed according to the method described in FIG. 9.

In the fourth embodiment described above, the MFP 200 uses a plurality of main scans (a plurality of nozzles Nz) to print common raster lines. Therefore, adverse effects caused by error in conveyance amounts (adverse effects on image quality) can be dispersed. Such adverse effects can be further dispersed since interlace printing and shingling can be combined in four-pass printing. The printing method of the fourth embodiment can improve image quality in partial areas by preventing characteristics of one nozzle being concentrated in a single line.

E. Fifth Embodiment

Figure 13:
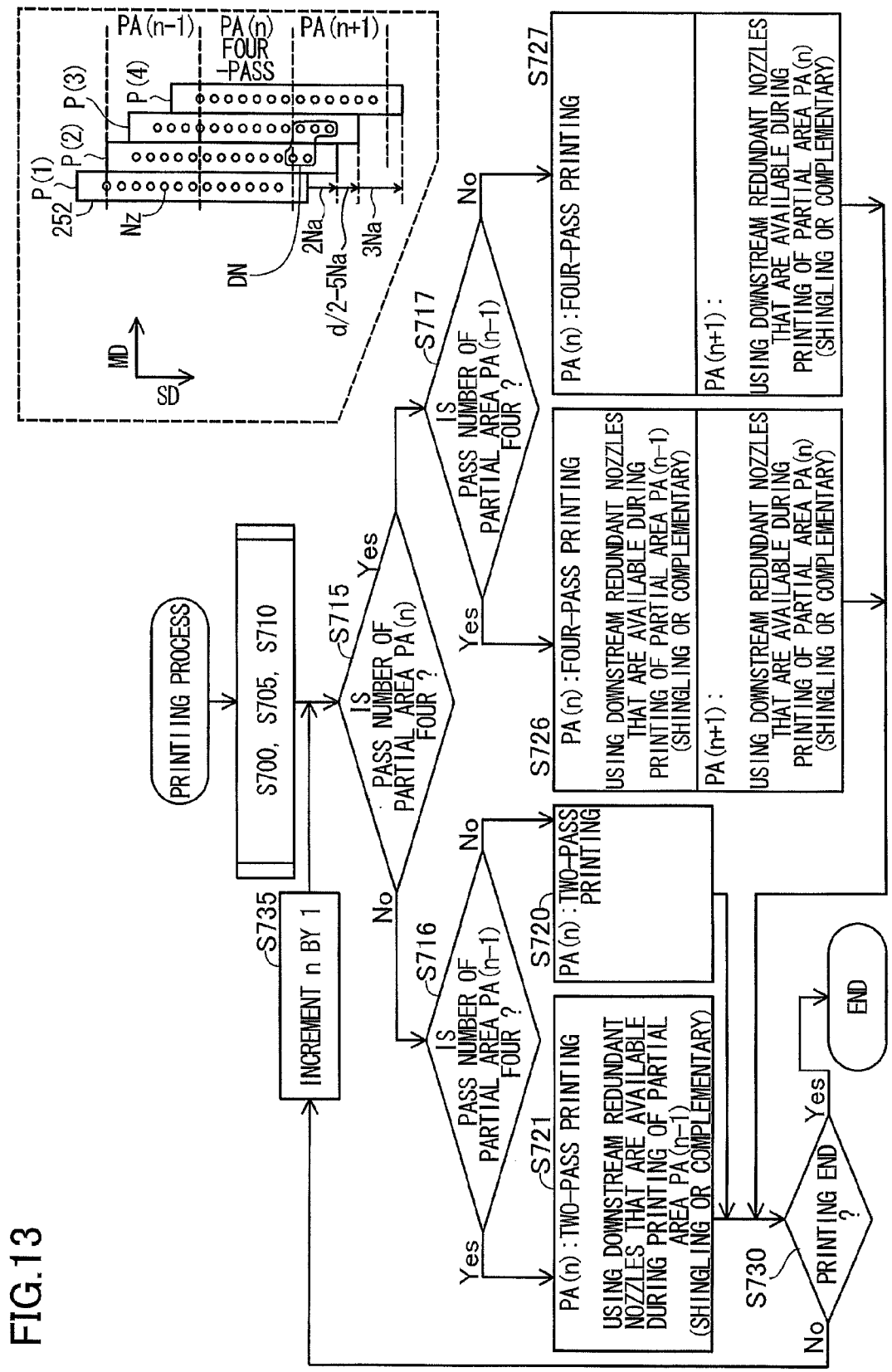
FIG. 13 is an explanatory diagram illustrating a printing process according to a fifth embodiment of the present invention.

FIG. 13 is a flowchart illustrating steps in a printing process executed by the multi-pass execution unit M210 according to a fifth embodiment of the invention. The process in FIG. 13 can be performed in place of the process described in FIG. 7. FIG. 13 includes a conceptual diagram of downstream redundant nozzles DN. The drawing includes four passes P(1)-P(4) used for printing an $n^{th}$ partial area PA(n) in four passes. As shown in the drawing, a portion of the nozzles DN on the downstream side of the print head 252 oppose the $(n+1)^{th}$ partial area PA(n+1) in each of the second and third passes P(2) and P(3) during four-pass printing. Thus, some of the downstream nozzles DN oppose an upstream portion of the $(n+1)^{th}$ partial area PA(n+1) in all passes of multi-pass printing for the $n^{th}$ partial area PA(n), excluding the first and last passes. The nozzles DN opposing the $(n+1)^{th}$ partial area PA(n+1) during passes that cover only a portion of the upstream side of the $(n+1)^{th}$ partial area PA(n+1) in the sub-scanning direction SD will be called "downstream redundant nozzles DN." In the fifth embodiment shown in FIG. 13, the multi-pass execution unit M210 uses the downstream redundant nozzles DN for printing, without modifying the sub scan conveyance amounts.

The initial steps S700, S705, and S710 of the process in FIG. 13 are identical to those described in FIG. 7. Subsequently, the multi-pass execution unit M210 selects one of four possible branches through determinations in the three steps S715, S716, and S717.

For example, the multi-pass execution unit M210 selects the first branch (S720) when printing a two-pass partial area immediately after another two-pass partial area (S715: N0, S716: NO). In this case, as in the printing example of FIG. 8, the multi-pass execution unit M210 performs two-pass printing for the target partial area PA(n).

The multi-pass execution unit M210 selects a second branch (S726) when printing a four-pass partial area immediately after another four-pass partial area (S715: YES, S716: YES). In S726 the multi-pass execution unit M210 performs the following two control processes.

Control 1: Modify four-pass printing of the target partial area PA(n) based on the downstream redundant nozzles DN available during four-pass printing of the preceding target partial area PA(n−1).

Control 2: Print part of the next partial area PA(n+1) using the downstream redundant nozzles DN available during four-pass printing of the target partial area PA(n).

Figure 14:
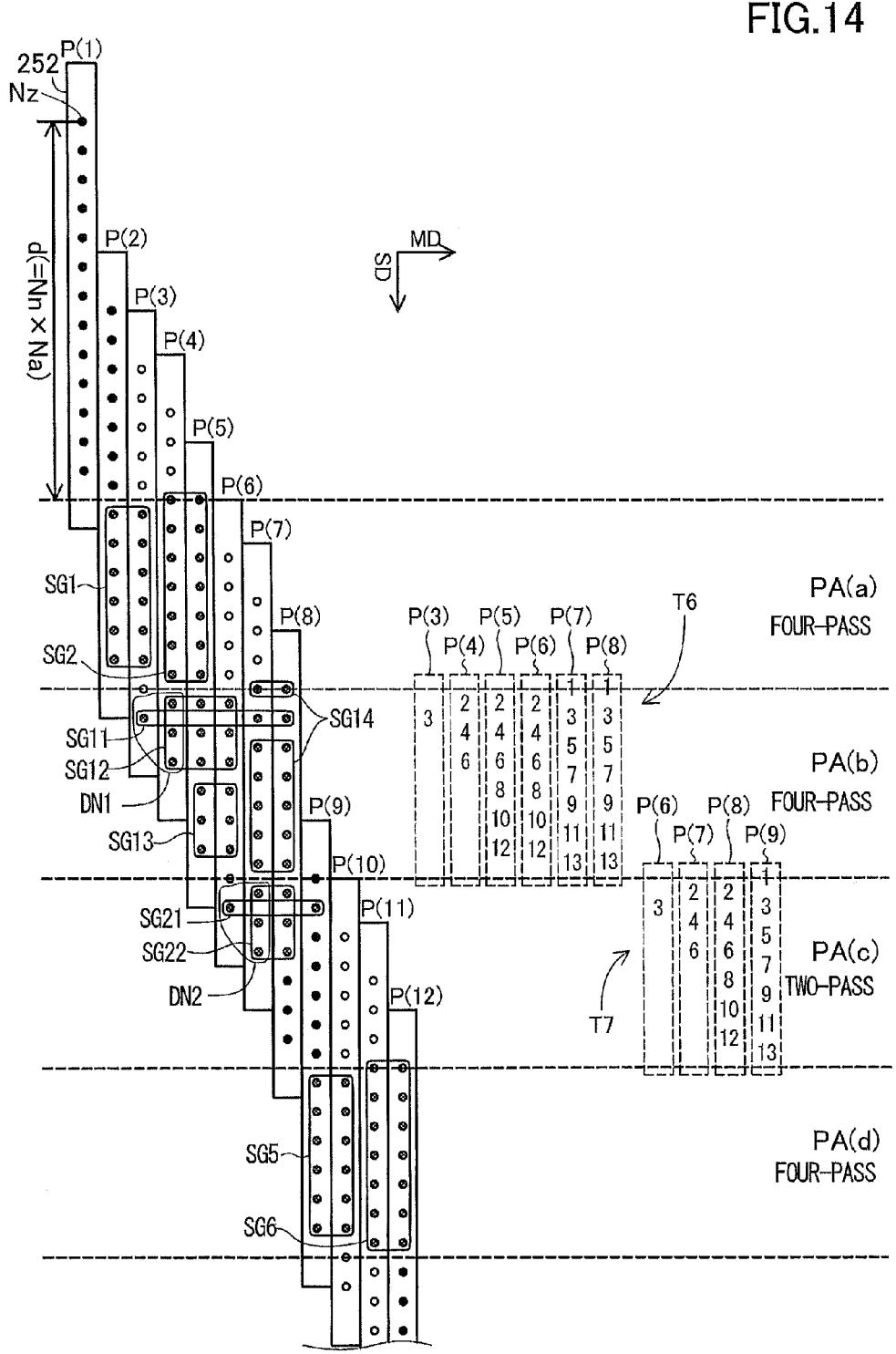
FIG. 14 is an explanatory diagram illustrating a printing example according to the fifth embodiment.

FIG. 14 is an explanatory diagram illustrating a printing example. As in FIG. 9, the example in FIG. 14 indicates four partial areas PA(a)-Pa(d) and twelve passes P(1)-P(12). The third partial area PA(c) has a pass number of "2" in FIG. 14, while all other partial areas PA(a), PA(b), and PA(d) have a pass number of "4" (as in FIG. 9). Conveyance amounts are set to the same values used in the example of FIG. 9.

In the following description, the second partial area PA(b) will serve as the target partial area. As shown in FIG. 14, the multi-pass execution unit M210 uses downstream redundant nozzles DN1 for printing part of the second partial area PA(b) in passes P(3) and P(4) for the first partial area PA(a) (described later in greater detail). A sixth table T6 shown in FIG. 14 indicates the relationship between raster line numbers in the second partial area PA(b) and the passes for printing these raster lines.

As shown in FIG. 14, the third raster line can be printed by nozzles Nz in three passes P(3), P(7), and P(8) represented by a first group SG11. The second, fourth, and sixth raster lines can be printed by nozzles Nz in the three passes P(4), P(5), and P(6) represented by a second group SG12. The multi-pass execution unit M210 uses the groups SG11 and SG12 to perform shingling, but the multi-pass execution unit M210 may perform complementary printing instead. In either case, in S726 the multi-pass execution unit M210 excludes pixel positions in the second partial area PA(b) assigned to the downstream redundant nozzles DN1 from pixel positions to be printed in the four passes P(5)-P(8) for the second partial area PA(b).

The multi-pass execution unit M210 also uses second downstream redundant nozzles DN2 during four-pass printing of the second partial area PA(b) for printing part of the third partial area PA(c). The second downstream redundant nozzles DN2 are redundant nozzles that become available in passes P(6) and P(7) while printing the second partial area PA(b). A seventh table T7 in FIG. 14 shows the relationship between the raster line numbers in the third partial area PA(c) and the passes for printing these raster lines.

The third raster line can be printed with nozzles Nz in two passes P(6) and P(9) represented by a first group SG21. The second, fourth, and sixth raster lines can be printed with nozzles Nz in the two passes P(7) and P(8) represented by a second group SG22. The multi-pass execution unit M210 performs shingling using these groups SG21 and SG22. However, the multi-pass execution unit M210 may perform complementary printing instead. In either case, in S726 the multi-pass execution unit M210 uses the second downstream redundant nozzles DN2 for printing part of the third partial area PA(c) in passes P(6) and P(7) for the second partial area PA(b).

A third group SG13 in FIG. 14 is equivalent to the third group SG3 in FIG. 12, excluding the nozzles Nz in the second group SG12. A fourth group SG14 is similarly equivalent to the fourth group SG4 in FIG. 12, excluding the nozzles Nz in the first group SG11. The other groups SG1, SG2, SG5, and SG6 in FIG. 14 are identical to the groups with the same reference numerals in FIG. 12.

The multi-pass execution unit M210 selects a third branch (S727 of FIG. 13) when printing a four-pass partial area immediately after a two-pass partial area (S715: YES, S716:

NO). In S727 the multi-pass execution unit M210 performs the following controls processes.

Control 1: Execute four-pass printing for the target partial area PA(n), as described in the example of FIG. 9.

Control 2: Print part of the successive partial area PA(n+1) using the downstream redundant nozzles DN available during four-pass printing of the target partial area PA(n).

Control 2 is the same process as described in S726. For example, passes P(3) and P(4) in FIG. 14 are printed using the downstream redundant nozzles DN1 according to Control 2 in S726 or S727.

The multi-pass execution unit M210 selects a fourth branch (S721) when printing a two-pass partial area immediately after a four-pass partial area (S715: NO, S716: YES). In S721 the multi-pass execution unit M210 modifies the two-pass printing of the target partial area PA(n) according to the downstream redundant nozzles DN that are available during four-pass printing of the preceding target partial area PA(n−1).

In the following description, the third partial area PA(c) of FIG. 14 will serve as the target partial area. As described above, passes P(6) and P(7) for the second partial area PA(b) also print part of the third partial area PA(c) with the second downstream redundant nozzles DN2. Thus, the multi-pass execution unit M210 excludes those pixel positions in the third partial area PA(c) that are assigned to the second downstream redundant nozzles DN2 from pixel positions to be printed in passes P(8) and P(9) for the third partial area PA(c).

After completing the above process for one of the four branches, the multi-pass execution unit M210 repeatedly executes step S735 for incrementing the number n by 1 and steps S715-S727 for printing until all partial areas PA have been printed (S730: YES). Printing ends after a YES determination in S730.

According to the fifth embodiment described above, the multi-pass execution unit M210 uses downstream redundant nozzles (the downstream redundant nozzles DN1 and DN2 in FIG. 14, for example) in printing. Consequently, adverse effects caused by error in conveyance amounts (adverse effects on image quality) can be further dispersed. Further, since the number of main scans used for printing partial areas can be increased without sacrificing printing speed, image quality can be improved without a loss of speed.

F. Sixth Embodiment

Figure 15:
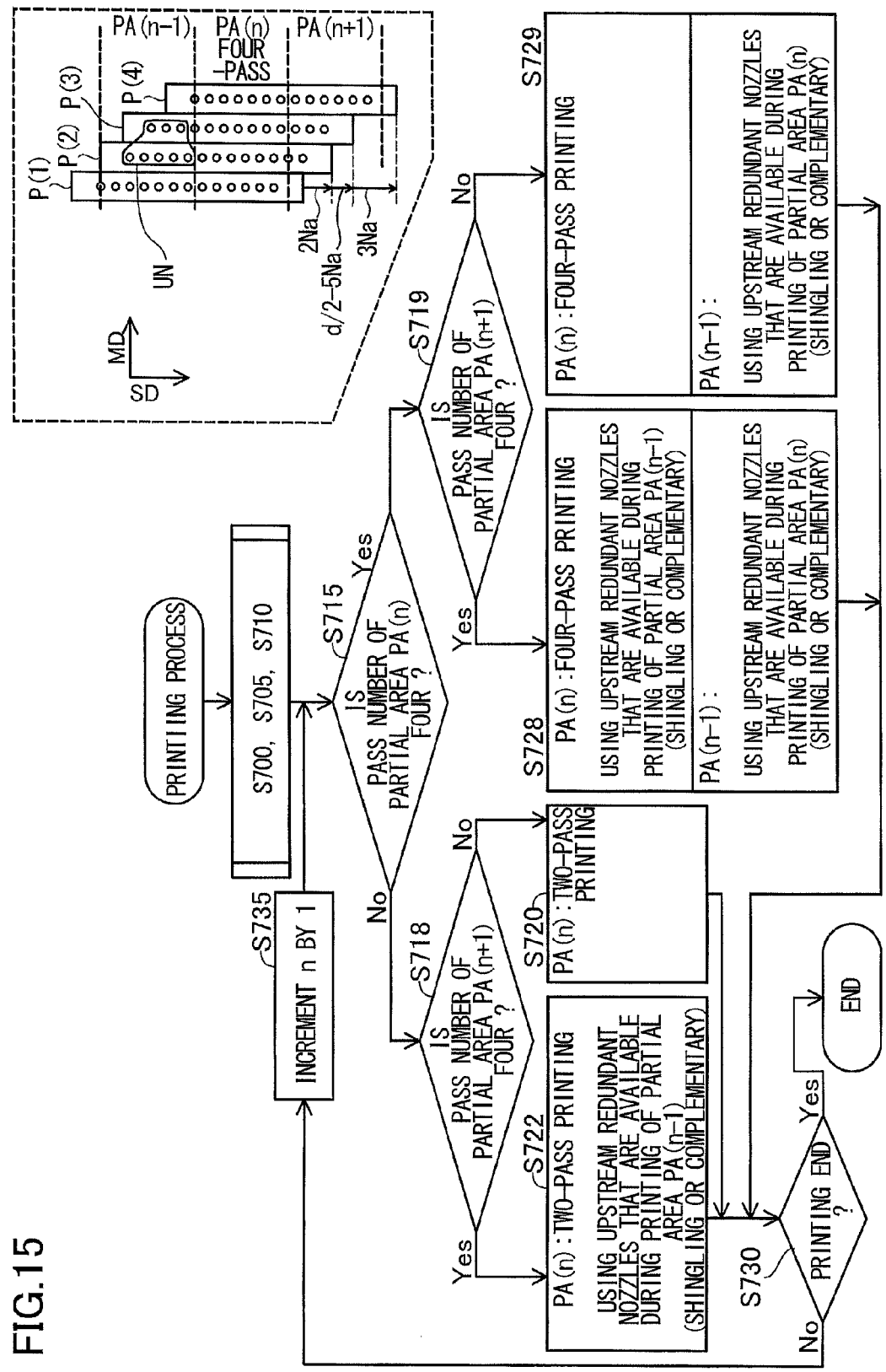
FIG. 15 is an explanatory diagram illustrating a printing process according to a sixth embodiment of the present invention.

FIG. 15 is a flowchart illustrating steps in a printing process executed by the multi-pass execution unit M210 according to a sixth embodiment of the invention. The process in FIG. 15 can be performed in place of the process described in FIG. 7. The sixth embodiment differs from the fifth embodiment described in FIG. 13 by using upstream redundant nozzles UN in place of the downstream redundant nozzles DN. FIG. 15 includes a conceptual diagram of the upstream redundant nozzles UN. The drawing includes four passes P(1)-P(4) used for printing an $n^{th}$ partial area PA(n) in four passes. As shown in the drawing, the portion of the nozzles UN on the upstream side of the print head 252 oppose the $(n-1)^{th}$ partial area PA(n−1) in each of the second pass P(2) and the third pass P(3) during four-pass printing. Thus, some of the upstream redundant nozzles UN oppose a downstream portion of the $(n-1)^{th}$ partial area PA(n−1) in all passes of multi-pass printing for the $n^{th}$ partial area PA(n), excluding the first and last passes. The nozzles UN opposing the $(n-1)^{th}$ partial area PA(n−1) during passes that cover only a portion of the downstream side of the $(n-1)^{th}$ partial area PA(n−1) in the sub-scanning direction SD will be called "upstream redundant nozzles UN." In the sixth embodiment shown in FIG. 15, the multi-pass execution unit M210 uses the upstream redundant nozzles UN for printing, without modifying the sub scan conveyance amounts.

The initial steps S700, S705, and S710 of the process in FIG. 15 are identical to those described in FIG. 7. Subsequently, the multi-pass execution unit M210 selects one of four possible branches through determinations in the three steps S715; S718, and S719.

For example, the multi-pass execution unit M210 selects the first branch (S720) when printing a two-pass partial area adjacent to another two-pass partial area on the upstream side (S715: NO, S718: NO). In this case, as in the printing example of FIG. 8, the multi-pass execution unit M210 performs two-pass printing for the target partial area PA(n).

The multi-pass execution unit M210 selects a second branch (S728) when printing a four-pass partial area adjacent to another four-pass partial area on the upstream side (S715: YES, S719: YES). In S728 the multi-pass execution unit 1V1210 performs the following two control processes.

Control 1: Modify four-pass printing of the target partial area PA(n) based on the upstream redundant nozzles UN available during four-pass printing of the succeeding target partial area PA(n+1).

Control 2: Print part of the preceding target partial area PA(n−1) using the upstream redundant nozzles UN available during four-pass printing of the target partial area PA(n).

Figure 16:
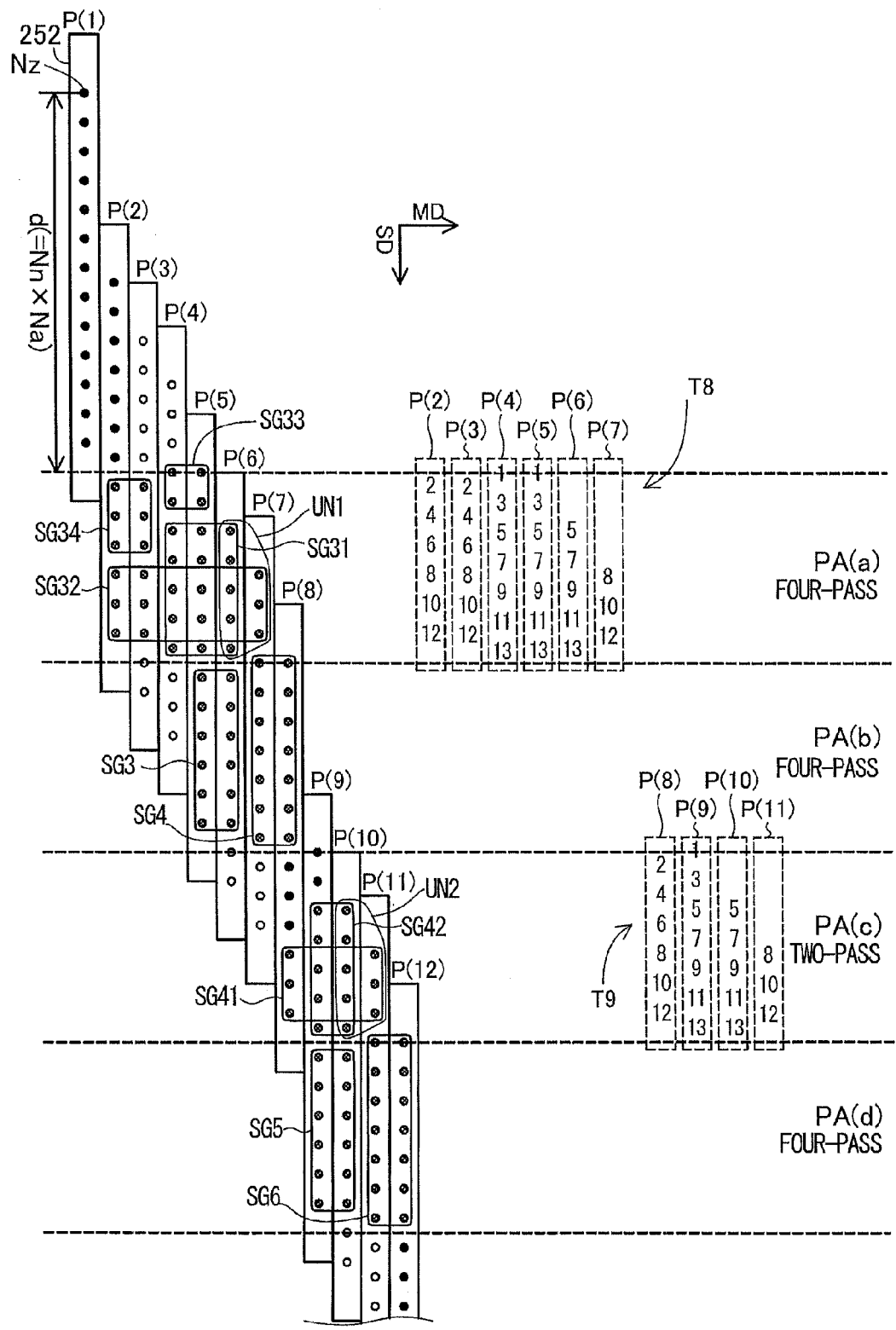
FIG. 16 is an explanatory diagram illustrating a printing example according to the sixth embodiment.

FIG. 16 is an explanatory diagram illustrating the printing example. FIG. 16 shows the same four partial areas PA(a)-Pa(d) shown in FIG. 15, as well as the twelve passes P(1)-P(12) in the sixth embodiment. Conveyance amounts are set to the same values shown in FIG. 15.

In the following description, the first partial area PA(a) will serve as the target partial area. As shown in FIG. 16, the multi-pass execution unit M210 uses upstream redundant nozzles UN1 for printing part of the first partial area PA(a) in passes P(6) and P(7) for the second partial area PA(b) (described later in greater detail). An eighth table T8 shown in FIG. 16 indicates the relationship between raster line numbers in the first partial area PA(a) and the passes for printing these raster lines.

As shown in FIG. 16, the fifth, seventh, ninth, eleventh, and thirteenth raster lines can be printed by nozzles Nz in three passes P(4), P(5), and P(6) represented by a first group SG31. The eighth, tenth, and twelfth raster lines can be printed by nozzles Nz in the three passes P(2), P(3), and P(7) represented by a second group SG32. The multi-pass execution unit M210 uses the groups SG31 and SG32 to perform shingling, but the multi-pass execution unit M210 may perform complementary printing instead. In either case, in S728 the multi-pass execution unit M210 excludes pixel positions in the second partial area PA(b) assigned to the upstream redundant nozzles UN1 from pixel positions to be printed in the four passes P(2)-P(5) for the first partial area PA(a).

Control 2 in S728 is identical to the Control 2 in S729 described below. The upstream redundant nozzles UN1 are used for printing in S729 when the second partial area PA(b) is the target partial area. This will be described in greater detail below with reference to S729.

The multi-pass execution unit M210 selects a third branch (S729) when printing a four-pass partial area adjacent to a two-pass partial area on the upstream side (S715: YES, S719: NO). In S729 the multi-pass execution unit M210 performs the following two control processes.

Control 1: Execute four-pass printing for the target partial area PA(n), as described in the example of FIG. 9.

Control 2: Print part of the preceding target partial area PA(n−1) using the upstream redundant nozzles UN available during four-pass printing of the target partial area PA(n).

In the following description of the Control Process 2, the second partial area PA(b) in FIG. 16 will serve as the target partial area. The multi-pass execution unit M210 prints part of the first partial area PA(a) using the upstream redundant nozzles UN1 in passes P(6) and P(7) for the second partial area PA(b). Although this description assumes the multi-pass execution unit M210 is performing shingling, the multi-pass execution unit M210 may perform complementary printing instead. The same Control Process 2 is performed in S728.

The multi-pass execution unit M210 selects a fourth branch (S722) when printing a two-pass partial area adjacent to a four-pass partial area on the upstream side (S715: NO, S718: YES). In S722 the multi-pass execution unit M210 modifies the two-pass printing of the target partial area PA(n) according to the upstream redundant nozzles UN that are available during four-pass printing of the succeeding target partial area PA(n+1).

In the following description, the third partial area PA(c) of FIG. 16 will serve as the target partial area. A ninth table T9 in FIG. 16 indicates the relationship between raster line numbers in the third partial area PA(c) and the passes for printing these raster lines. As shown in FIG. 16, the multi-pass execution unit M210 uses second upstream redundant nozzles UN2 for printing part of the third partial area PA(c) in passes P(10) and P(11) for the fourth partial area PA(d).

The eighth, tenth, and twelfth raster lines can be printed with nozzles Nz in two passes P(8) and P(11) represented by a first group SG41. The fifth, seventh, ninth, eleventh, and thirteenth raster lines can be printed with nozzles Nz in the two passes P(9) and P(10) represented by a second group SG42. The multi-pass execution unit M210 performs shingling using these groups SG41 and SG42. However, the multi-pass execution unit M210 may perform complementary printing instead. In S722 the multi-pass execution unit M210 excludes those pixel positions in the third partial area PA(c) that will be assigned to the second upstream redundant nozzles UN2 from pixel positions to be printed in passes P(8) and P(9) for the third partial area PA(c).

A third group SG33 in FIG. 16 is equivalent to the second group SG2 in FIG. 12, excluding the nozzles Nz in the first group SG31. A fourth group SG34 is equivalent to the first group SG1 in FIG. 12, excluding the nozzles Nz in the second group SG32. The other groups SG3, SG4, SG5, and SG6 are identical to the groups with the same reference numbers in FIG. 12.

According to the sixth embodiment described above, the multi-pass execution unit M210 uses upstream redundant nozzles UN (the upstream redundant nozzles UN1 and UN2 in FIG. 16, for example) in printing. Consequently, adverse effects caused by error in conveyance amounts (adverse effects on image quality) can be further dispersed. Further, since the number of main scans used for printing partial areas can be increased without sacrificing printing speed, image quality can be improved without a loss of speed.

G. Seventh Embodiment

Figure 17:
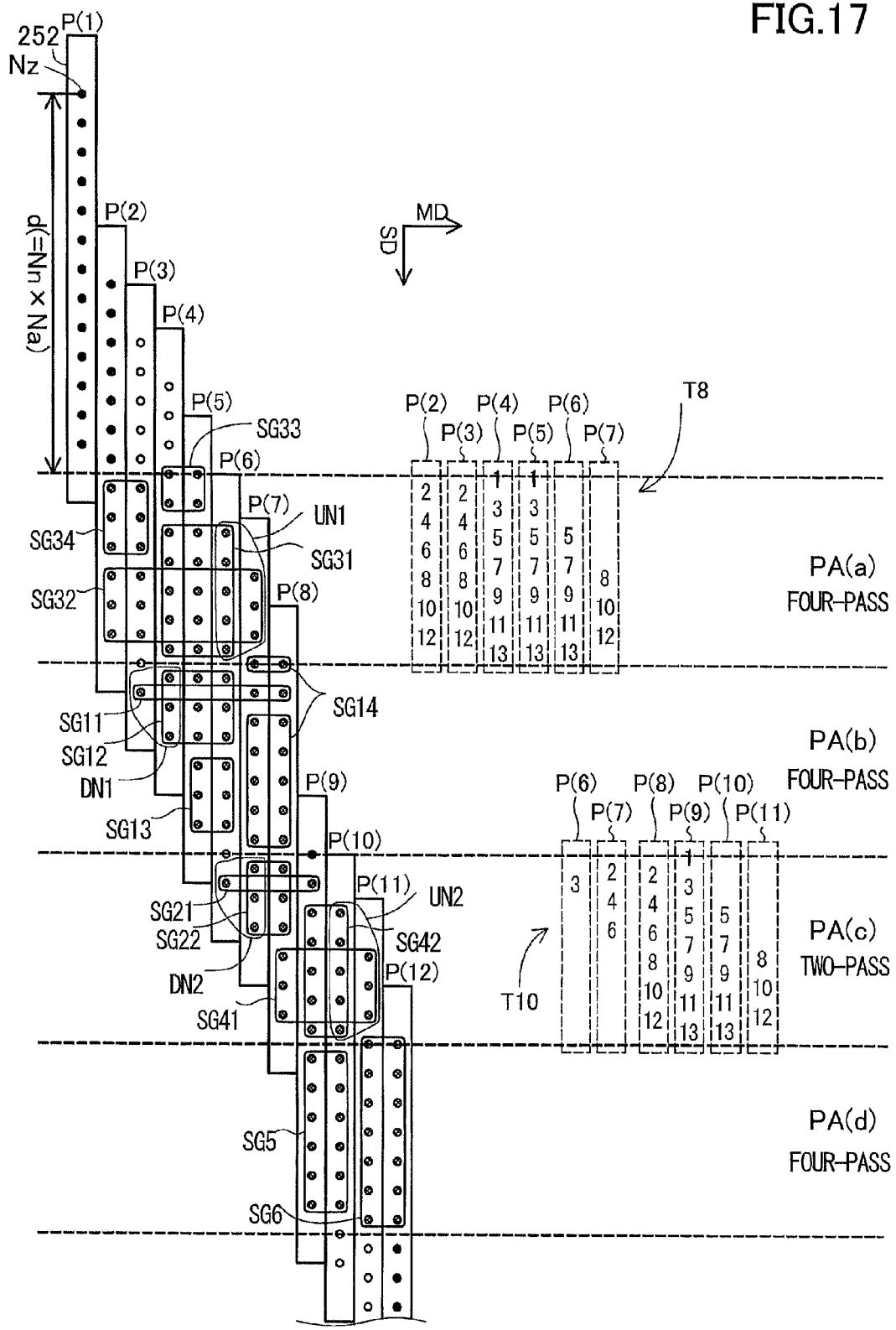
FIG. 17 is an explanatory diagram illustrating a printing example according to a seventh embodiment of the present invention.

FIG. 17 is an explanatory diagram illustrating a printing example according to a seventh embodiment of the invention. In the seventh embodiment, the multi-pass execution unit M210 uses both the downstream redundant nozzles DN (FIG. 13) and the upstream redundant nozzles UN (FIG. 15) for printing. The example in FIG. 17 is for printing the same four partial areas PA(a)-Pa(d) shown in FIGS. 14 and 16. In this printing example, the multi-pass execution unit M210 performs parallel printing using the downstream redundant nozzles DN1 and DN2 shown in FIG. 14 and the upstream redundant nozzles UN1 and UN2 shown in FIG. 16. (Nozzle groups in FIG. 17 corresponding to nozzle groups in the previous embodiments are designated with the same reference numbers.) A tenth table T10 in FIG. 17 shows the relationship between raster line numbers in the third partial area PA(c) and the passes that print these raster lines. As shown in the drawing, printing of the third partial area PA(c) is distributed among six passes P(6)-P(11) by using the second downstream redundant nozzles DN2 and second upstream redundant nozzles UN2.

In this way, the multi-pass execution unit M210 uses both the upstream redundant nozzles UN and the downstream redundant nozzles DN for further dispersing adverse effects caused by error in conveyance amounts (adverse effects on image quality). Further, since the number of main scans used for printing partial areas can be increased without sacrificing printing speed, image quality can be improved without a loss of speed.

H. Eighth Embodiment

In an eighth embodiment of the invention, the MFP 200 includes the nonvolatile memory 230 and second acceptable error data 239 of FIG. 1. The remaining structure is identical to that described in the first embodiment. In the eighth embodiment, the pass number determination unit M220 sets the pass number in the pass number setting process of FIG. 6 in which step S618 is included. The remaining steps in the process are identical to those described in any of the preceding embodiments.

In the eighth embodiment, the pass number determination unit M220 can use the second acceptable error data 239 in addition to the first acceptable error data 238. An overview of the second acceptable error data 239 is shown in the bottom of FIG. 4. As described above, the first acceptable error data 238 is set based on the first threshold dEth1, but the second acceptable error data 239 is set based on a second threshold dEth2, which is smaller than the first threshold dEth1. The second threshold dEth2 is set to a value within the range 1-3, for example. Three conveyance errors Efa2, Efb2, and Efc2 at which the estimated color difference edE becomes the second threshold dEth2 are identified from the three graphs GF11, GF12, and GF13. As shown in the fourth graph GF14, these three correlations are used together with the end data Pa and Pb to set a second curve 239c. As shown in the graph, the acceptable error Efa determined based on the second curve 239c is smaller than the acceptable error Efa determined from the same input gradation value Vi based on the first curve 238c. The second acceptable error data 239 includes data required for identifying the second curve 239c set according to the method described above. Note that the second threshold dEth2 is the same for all colors of ink. However, the second threshold dEth2 may be set to different values for each of the colors of ink. In this case, a different second threshold dEth2 will be acquired for each color of ink.

The fourth graph GF14 shows three ranges VRa2, VRb2, and VRc2 determined based on the second curve 239c and the actual error aEf. The first range VRa2 and third range VRc2 together constitute the two-pass range, and the second range VRb2 is the four-pass range.

The acceptable error Efa of the second curve 239c is smaller than the acceptable error Efa of the first curve 238c. Hence, the four-pass range is wider when using the second curve 239c (second acceptable error data 239) than when using the first curve 238c (first acceptable error data 238). Consequently, high-quality printing can be achieved by dispersing the adverse effects caused by error in conveyance amounts (adversely affecting image quality). However, the two-pass range is wider when using the first curve 238c than when using the second curve 239c. In this case, high-speed printing is possible. In either case, the multi-pass execution unit M210 can print in two modes using a number of main scans that is suitable for both the print execution unit 250 and the image being printed.

In S618 of FIG. 6, the mode selection unit M230 selects one of the first and acceptable error data 238 and 239. The mode selection unit M230 selects the acceptable error data based on an instruction inputted from an external source. This instruction may be inputted by a user on the operating unit 270 or inputted from an external device into the MFP 200 via the communication unit 290, for example. In any case, the pass number determination unit M220 sets the pass number based on the acceptable error data selected by the mode selection unit M230. The process of S618 may be performed at any timing prior to performing the S620 (between steps S600 and S605, for example).

While the invention has been described in detail with reference to the first through eighth embodiments thereof, it would be apparent to those skilled in the art that various changes and modifications may be made therein without departing from the spirit of the invention.

(1) When redundant nozzles are used in the embodiments described above, printing is performed using not only passes of the number set by the pass number determination unit M220, but also passes intended for printing other partial areas. In passes using redundant nozzles, the nozzles of the print head 252 are arranged only across a portion of the partial area in the sub-scanning direction SD. In the embodiments described above, the pass number determination unit M220 can set the total number of passes such that the nozzles are arranged across the entire partial area in the sub-scanning direction SD.

(2) The structure of the print head 252 is arbitrary and not limited to that shown in FIG. 7. For example, the print head may include a plurality of nozzles at the same position in the sub-scanning direction SD. With this configuration, the plurality of nozzles can print a single raster line in one main scan. In addition, the number of types (colors) of ink used in the MFP 200 is arbitrary and not limited to four.

The pitch Na of the nozzles Nz is not limited to two times the line interval LD in the sub-scanning direction SD, provided that the pitch Na is set to J times the interval LD, where J is an integer of 2 or greater. When performing interlace printing in a single partial area, the partial area may be printed in J main scans.

(3) In the first through eighth embodiments described above, the pass number determination unit M220 uses a combination of two and four passes when setting the pass numbers, but the pass number determination unit M220 may employ a combination of N passes and M passes, where N is an integer of 2 or greater and M is an integer greater than N. In any case, it is preferable that the MFP 200 perform interlace printing for both N-pass printing and M-pass printing. In M-pass printing, it is preferable that a plurality of nozzles is used to print at least one raster line. Further, the printing resolution is preferably the same for both N-pass printing and M-pass printing. It is also preferable that the range for N-pass printing within the entire range of representative input gradation values Vir (hereinafter called the "N-pass range") grows narrower while the range for M-pass printing (hereinafter called the "M-pass range") grows wider as the actual error aEf is increased. Here, the N-pass range and the M-pass range may change continuously or in steps in response to changes in the actual error aEf. In either case, when the range of representative input gradation values Vir changes due to an increase in the actual error aEf, it is preferable that the M-pass range prior to this increase falls within the M-pass range after the increase and that at least a portion of the N-pass range prior to the increase falls within the M-pass range after the increase.

It is further preferable that the sum of conveyance amounts for main scans in N-pass printing when the pass number determination unit M220 has selected N passes, and the sum of conveyance amounts for main scans in M-pass printing when the pass number determination unit M220 has selected M passes are both equivalent to the area width AW of a single partial area PA. With this configuration, the final pass for an $n^{th}$ partial area PA(n) in N-pass printing (or M-pass printing) can implement the initial pass of the $(n+1)^{th}$ partial area PA(n+1) in N-pass printing (or M-pass printing). As a result, by repeating main scans and sub scans, the print head 252 can perform multi-pass printing for each partial area PA while printing two adjacent partial areas PA simultaneously.

(4) The functions of the print process unit M200 may be implemented by any of a variety of devices in addition to the MFP 200, such as a common computer.

(5) In the first through eighth embodiments described above, various parameters representing the brightness of the image being printed may be employed as the input gradation values Vi. For example, the input gradation values Vi may be brightness values calculated from RGB levels, and any of various conventional methods may be used to calculate the brightness values. Further, the representative input gradation value Vir may be set to any of a variety of values in addition to the average of the input gradation values Vi for a specific partial area, such as the mode of the input gradation values Vi in the partial area. In place of the first acceptable error data 238, the nonvolatile memory 230 may store data identifying the two-pass range and four-pass range (or more generally, the N-pass range and M-pass range) set according to the actual error aEf. In this case, the actual error data 236 may be omitted from the nonvolatile memory 230 and the pass number determination unit M220 may set the pass number based on the representative input gradation value Vir.

(6) The correlations between the representative input gradation values Vir and the acceptable error Efa may be set according to any method and is not limited to the method shown in FIGS. 2 through 4 of the embodiments. For example, rather than using a histogram of brightness values in S220 of FIG. 2, the dot coverage CR may be calculated by distinguishing pixels representing ink dots dt and pixels representing the exposed portion pp through pattern matching of an image representing the ink dots dt. The correlations between the representative input gradation values Vir and the acceptable error Efa may also be set without using the patches PT shown in FIG. 2. For example, the simulations described in FIG. 3 may be performed to identify correlations between the rate of change of the dot coverage CR (based on a conveyance error Ef of zero) and the conveyance errors Ef, and the conveyance error Ef at which the rate of change of the dot coverage CR is a prescribed threshold may be used as the acceptable error Efa. The acceptable error Efa may be set in this way for each of a plurality of differing input gradation values Vi.

(7) Rather than the actual error aEf described in FIG. 5 of the embodiments (more generally, error derived from measured conveyance amounts), the pass number determination unit M220 may use a preset value (a design target value, for example). The pass number determination unit M220 may also use a user-inputted value (hereinafter referred to as an "input error value") in place of the actual error aEf. Setting the input error value to a larger value indicates a desire to obtain printing results of a prescribed quality, even when there are large conveyance errors, i.e., a desire to perform printing that is more, robust in the face of variations in conveying precision. By increasing the input error value, the user can obtain a more stable printing quality. Thus, by increasing the input error value, the user can issue a command to execute "fine-quality printing." Conversely, setting a smaller input error value will reduce the robustness of the printing operation in response to variations in conveying precision, but will minimize the number of main scans while maintaining an image quality corresponding to the input error value and the actual error. In other words, by reducing the input error value, the user can issue a command to execute "fast printing." The pass number determination unit M220 may employ any of various methods for acquiring user commands for selecting input error values. For example, the pass number determination unit M220 may set the input error value based on a user command inputted via the operating unit 270. The pass number determination unit M220 may also provide a user interface contrasting "fine-quality printing" with "fast printing" and may acquire an input error value corresponding to a user-inputted command by implementing a conversion function to increase the input error value when the user has selected "fine-quality printing" and to reduce the input error value when the user has selected "fast printing." The interface may be displayed on the display unit 280, for example.

(8) Part of the configuration implemented in hardware in the embodiments may be replaced with software and, conversely, all or part of the configuration implemented in software in the embodiments may be replaced with hardware. For example, the functions of the print process unit M200 shown in FIG. 1 may be implemented in hardware configured of logic circuits.

When all or part of the functions of the present invention are implemented in software, the software (i.e., computer programs) can be stored on a computer-readable storage medium. The "computer-readable storage medium" may be a portable medium, such as a memory card or CD-ROM; an internal storage device built into the computer, such as any of various RAM, ROM, or the like; or an external storage device, such as a hard disk drive, connected to the computer.

What is claimed is:

1. A control device configured to control a printing unit to execute a multi-pass printing, the printing unit including a print head, first conveying unit, a head driving unit, and a second conveying unit, the print head having a plurality of nozzles, the first conveying unit configured to reciprocate the print head in a first direction relative to a printing medium, the head driving unit configured to drive the print head to form ink dot on the printing medium, the second conveying unit configured to convey the printing medium in a second direction perpendicular to the first direction, the control device comprising:

a multi-pass execution unit configured to control the printing unit to execute the multi-pass printing for a predetermined partial area of the printing medium by executing a main scan and a sub-scan a prescribed number of times, wherein in the main scan, the print head forms the ink dot on the printing medium while being conveyed by the first conveying unit in the first direction, and in the sub-scan, the second conveying unit conveys the printing medium in the second direction;

an acceptable range determining unit configured to determine an acceptable range of gradation values based on an actual error in a conveyance amount of the second conveying unit; and a number setting unit configured to set the prescribed number based on the acceptable range of gradation values and a representative gradation value of the predetermined partial area;

wherein the number setting unit sets the prescribed number to N where N is an integer greater than or equal to 2 when the representative gradation value falls in the acceptable range of gradation values, and the number setting unit sets the prescribed number to M where M is an integer greater than N when the representative gradation value does not fall in the acceptable range of gradation values.

2. The control, device according to claim 1, wherein the acceptable range becomes narrower while the actual error increases.

3. The control device according to claim 1, wherein the acceptable range determining unit determines the acceptable range based on acceptable error data, the acceptable error data indicating correspondence relationships between the representative gradation value and a maximum acceptable error of conveyance amount in the second direction, the acceptable range being a range of representative gradation values wherein an actual error corresponding to a representative gradation value is smaller than a maximum acceptable error corresponding to the representative gradation value.

4. The control device according to claim 1, further comprising a mode selecting unit configured to select one of a plurality of modes, the plurality of modes including a first mode in which the acceptable range is a first acceptable range and a second mode in which the acceptable range is a second acceptable range narrower than the first acceptable range, wherein the number setting unit is configured to set the prescribed number based on the first acceptable range when the first acceptable range is selected by the mode selecting unit, and based on the second acceptable range when the second acceptable range is selected by the selecting unit.

5. The control device according to claim 1, wherein the multi-pass execution unit is configured to control the printing unit to execute M number of main scans including a first main scan and a second main scan subsequent to the first main scan when the number setting unit sets the prescribed number to M, the printing unit printing a plurality of first raster lines by executing the first main scan, the printing unit printing at least one second raster line between two of the plurality of first raster lines adjacent to each other by executing the second main scan, the multi-pass execution unit controlling the print head to print, with at least two of the plurality of nozzles, at least one of: the at least one second raster line, and the plurality of first raster lines.

6. The control device according to claim 1, wherein the multi-pass execution unit is configured to control the printing unit to execute M number of main scans when the number setting unit sets the prescribed number to M, wherein in the M number of main scans, the printing unit prints the predetermined partial area and a part of adjacent area adjacent to the predetermined partial area.

7. The control device according to claim 6, wherein the number setting unit is further configured to set a predetermined number for the adjacent area;

wherein the multi-pass execution unit is configured to control the printing unit to execute the M number of main scans for the predetermined partial area when the number setting unit sets the predetermined number to N, wherein in the M main scans, the printing unit prints the predetermined partial area and the part of adjacent area, the part of the adjacent area being printed by at least one of the plurality of nozzles that faces the adjacent area while the multi-pass execution unit is executing the M main scans for the predetermined partial area.

8. A control method for executing a multi-pass printing for a predetermined partial area of a printing medium by executing a main scan and a sub-scan a prescribed number of times, wherein in the main scan, a print head forms the ink dot on a printing medium while being conveyed in a first direction, and in the sub-scan, the printing medium is conveyed in a second direction perpendicular to the first direction, the control method comprising:
- acquiring an actual error in a conveyance amount in the second direction;
- acquiring a maximum acceptable error in a conveyance amount in the second direction and representative gradation value of the predetermine partial area, and indicating relationships between the maximum acceptable error and the representative gradation value;
- setting a pass number to N where N is an integer greater than or equal to 2 when the actual error is smaller than or equal to the acceptable error corresponding to the representative gradation value;
- setting the pass number to M wherein M is an integer greater than N when the actual error is greater than the acceptable error corresponding to the representative gradation value; and
- executing the multi-pass printing for the predetermined partial area by executing the pass number of main scans.

9. The control method according to claim 8, wherein the acquiring acquires the error data by:
- printing a plurality of test patches on the printing medium using a plurality of input values different from each other;
- determining a first relationship between dot coverages of the plurality of test patches and measured values of the plurality of test patches, a dot coverage of a test patch indicating a ratio of area in which an ink dot is covered on the patch;
- determining a second relationship between the actual error and the dot coverage of each of the plurality of input values;
- determining a third relationship between the measured value of each of the plurality of input values and an error in a conveyance amount in the second direction based on the first relationship and the second relationship; and
- determining a maximum acceptable error for each of the plurality of input values based on the third relationship with reference to a color difference between a measured value corresponding to an error whose value is zero and a measured value corresponding to an error whose value is greater than zero.

10. The control method according to claim 9, wherein the determining determines the first relationship by:
- generating image data by optically reading the plurality of test patches formed on the printing medium, the image data including a plurality of pixels each having a gradation value;
- setting a threshold value between a first peak and a second peak that are in distribution of the gradation values of the plurality of pixels, the first peak corresponding to a gradation value of a first pixel representing that the ink dot is formed on the printing medium, the second peak corresponding to a gradation value of a second pixel representing that any ink dot is not formed on the printing medium;
- classifying the plurality of pixels into one of the first pixel and the second pixel based on the threshold value; and
- calculating the dot coverage based on a classification result obtained by the classifying.

\* \* \* \* \*